United States Patent
Nakajima et al.

(10) Patent No.: US 8,049,383 B2
(45) Date of Patent: Nov. 1, 2011

(54) INTEGRATED CAPACITOR-TYPE STATOR

(75) Inventors: Yuki Nakajima, Yokohama (JP); Tomoya Imazu, Yokokama (JP); Yukio Mizukoshi, Machida (JP); Sho Sato, Yokohama (JP); Yusuke Zushi, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 318 days.

(21) Appl. No.: 12/133,067

(22) Filed: Jun. 4, 2008

(65) Prior Publication Data

US 2008/0303362 A1    Dec. 11, 2008

(30) Foreign Application Priority Data

Jun. 8, 2007 (JP) ................. 2007-153188
Feb. 22, 2008 (JP) ................. 2008-041988
May 12, 2008 (JP) ................. 2008-124642

(51) Int. Cl.
*H02K 11/00* (2006.01)
(52) U.S. Cl. ............... 310/72; 310/67 R; 310/68 R
(58) Field of Classification Search .......... 310/72, 310/216.001, 216.016–216.018, 216.076, 310/216.104–216.105, 71, 73, 216.079, 177
See application file for complete search history.

(56) References Cited

U.S. PATENT DOCUMENTS

| 2,088,949 | A | * | 8/1937 | Fekete | 428/622 |
| 4,211,944 | A | * | 7/1980 | Haller | 310/72 |
| 4,323,804 | A | * | 4/1982 | Zelt | 310/72 |
| 5,179,307 | A | * | 1/1993 | Porter | 310/68 B |
| 6,177,751 | B1 | * | 1/2001 | Suzuki et al. | 310/269 |
| 6,806,608 | B2 | * | 10/2004 | Chen | 310/166 |
| 2006/0186746 | A1 | * | 8/2006 | Nanbu et al. | 310/68 R |

FOREIGN PATENT DOCUMENTS

| EP | 2093867 A1 | * | 8/2009 |
| GB | 2350239 A | * | 11/2000 |
| JP | 2003-274599 | | 9/2003 |

OTHER PUBLICATIONS

Garvey et al., IEE Proceedings-Electrical Power Applications, Sep. 2000, vol. 147, No. 5, pp. 367-370.*
Lipp et al, EP 2093867 A1 Machine Translation, Aug. 2009.*

* cited by examiner

*Primary Examiner* — Quyen Leung
*Assistant Examiner* — Eric Johnson
(74) *Attorney, Agent, or Firm* — Global IP Counselors, LLP

(57) ABSTRACT

A motor is basically provided with a rotor and a stator. The stator includes a plurality of stacked magnetic entities, a dielectric material disposed between adjacent ones of the magnetic entities, a positive electrode part provided on at least one of the magnetic entities and a negative electrode part provided on at least one of the magnetic entities that does not have the positive electrode part. The positive electrode part is arranged for connecting to a positive side of an external circuit. The negative electrode part arranged for connecting to a negative side of the external circuit.

26 Claims, 30 Drawing Sheets

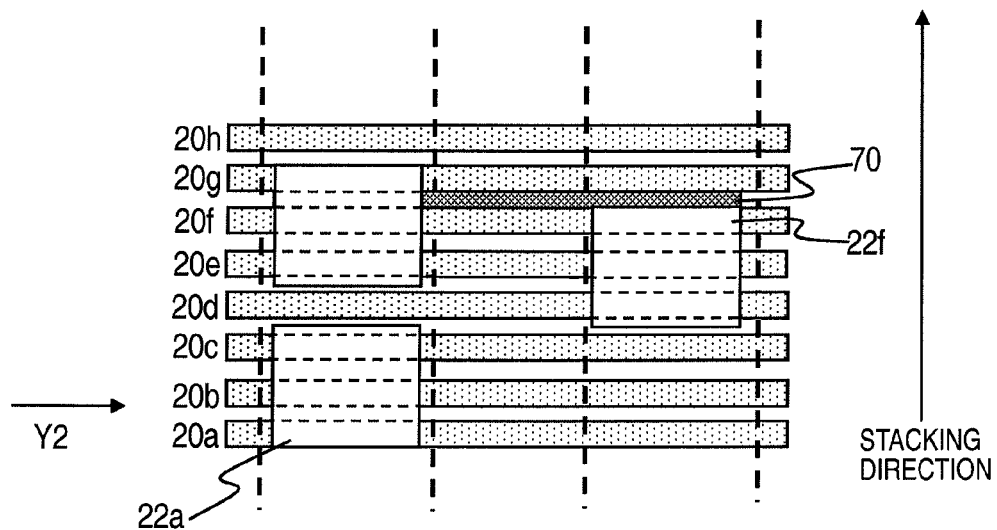
*FIG. 12A*
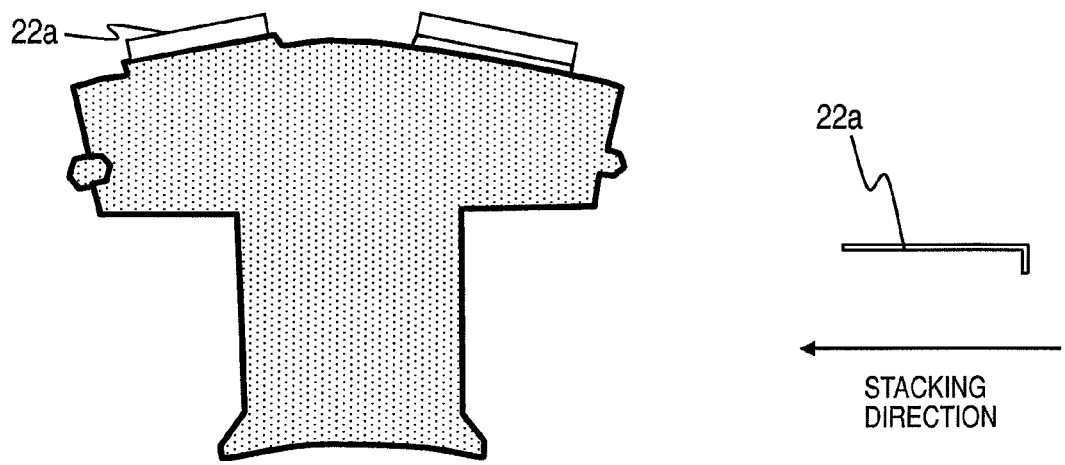
*FIG. 12B*     *FIG. 12C*

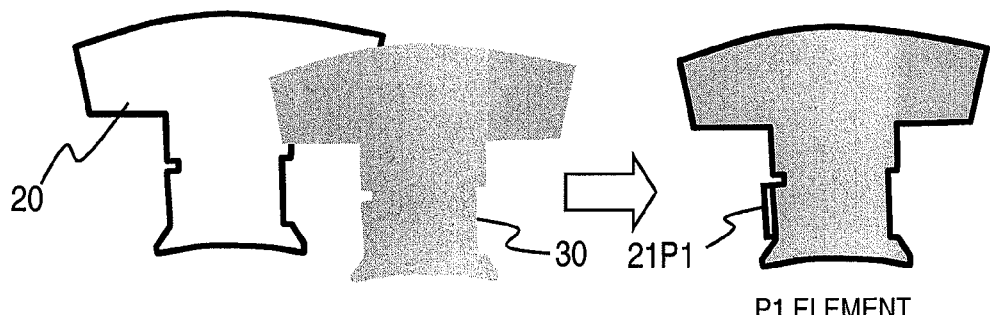
FIG. 15A — P1 ELEMENT
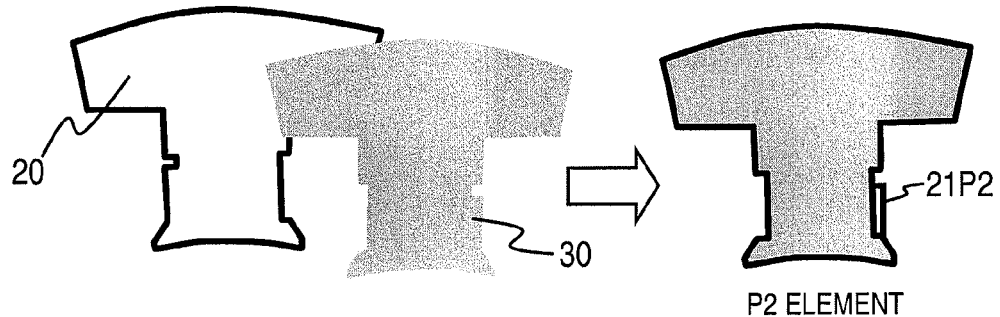
FIG. 15B — P2 ELEMENT
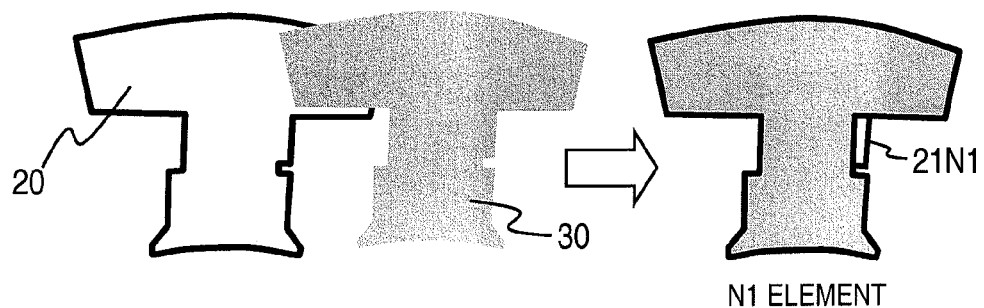
FIG. 15C — N1 ELEMENT
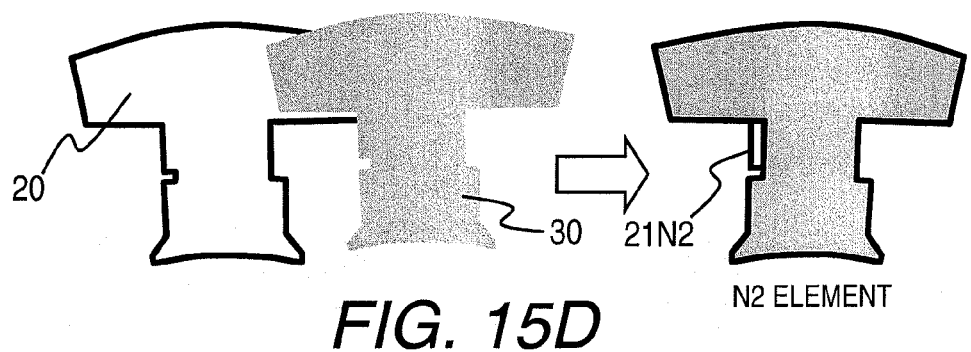
FIG. 15D — N2 ELEMENT

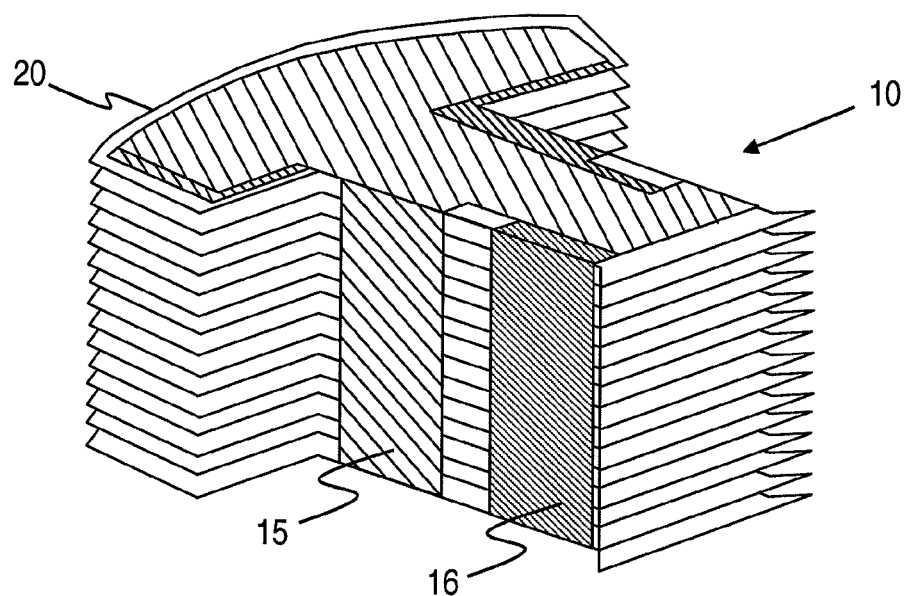
*FIG. 21A*
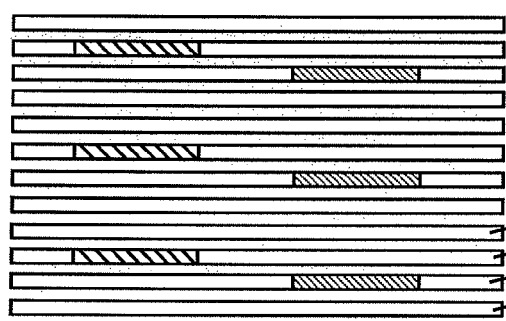
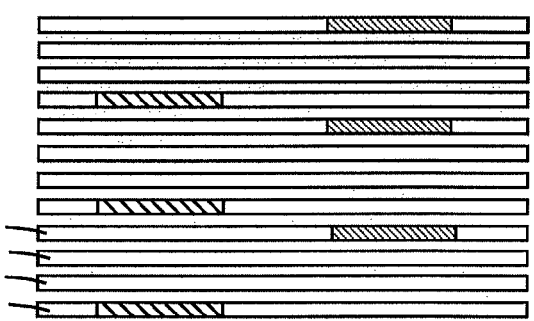
*FIG. 21B*

INTEGRATED CAPACITOR-TYPE STATOR

CROSS-REFERENCE TO RELATED APPLICATIONS

This application claims priority to Japanese Patent Application No. 2007-153188, filed on Jun. 8, 2007, Japanese Patent Application No. 2008-041988, filed on Feb. 22, 2008 and Japanese Patent Application No. 2008-124642, filed on May 12, 2008. The entire disclosures of Japanese Patent Application Nos. 2007-153188, 2008-041988 and 2008-124642 are hereby incorporated herein by reference.

BACKGROUND OF THE INVENTION

1. Field of the Invention

The present invention generally relates to a motor having a stator equipped with an integrated capacitor and a motor system incorporating such a motor 2. Background Information There are situations in which an electric power converting device is used to convert direct current electric power into alternating current electric power and supply the alternating current electric power to an electric motor. Such a conventional electric power converting device requires the use of a capacitor to smooth the voltage. Conventional technology reduces the overall size of a drive apparatus that includes an electric motor and an electric power converting device by providing a dead space inside the motor for a voltage smoothing capacitor. One example of such a drive apparatus is disclosed in Japanese Laid-Open Patent Publication No. 2003-274599.

In view of the above, it will be apparent to those skilled in the art from this disclosure that there exists a need for an improved motor. This invention addresses this need in the art as well as other needs, which will become apparent to those skilled in the art from this disclosure.

SUMMARY OF THE INVENTION

It has been discovered that with the aforementioned known technology, the dead space available for storing the capacitor decreases when the size of the motor itself is reduced in order to reduce the size of the drive apparatus as a whole. Consequently, there is a limit to how small the drive apparatus can be made because it becomes difficult to arrange the capacitor inside the motor. One object of the present invention is to provide a motor with a capacitor arrangement that reduces the overall size of a motor system that includes the motor because a capacitor function is incorporated into the stator of the motor.

In order to achieve the above mentioned object, a motor is basically provided that comprises a rotor and a stator. The stator includes a plurality of stacked magnetic entities, a dielectric material disposed between adjacent ones of the magnetic entities, a positive electrode part provided on at least one of the magnetic entities and a negative electrode part provided on at least one of the magnetic entities that does not have the positive electrode part. The positive electrode part is arranged for connecting to a positive side of an external circuit. The negative electrode part arranged for connecting to a negative side of the external circuit.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 12A shows an example of how the electrode parts (internal electrodes) of the magnetic steel plates are arranged in the motor according to the fourth embodiment when viewed from the outside of the stator in a radially inward direction;

FIG. 12B is an axial view showing the shape of an electrode part of a magnetic steel plate;

FIG. 12C shows the shape of an electrode part when viewed from the direction of the arrow Y2 shown in FIG. 12A;

FIG. 15A shows an element comprising a magnetic steel plate and an dielectric material, a plurality of which elements forms a stator of a motor according to a seventh embodiment;

FIG. 15B shows an element comprising a magnetic steel plate and an dielectric material of a stator of a motor according to a seventh embodiment;

FIG. 15C shows another element comprising a magnetic steel plate and an dielectric material of the stator according to the seventh embodiment;

FIG. 15D shows another element comprising a magnetic steel plate and an dielectric material of the stator according to the seventh embodiment;

FIG. 21A is a perspective view of a divided core comprising a stack of elements in accordance with the ninth embodiment;

FIG. 21B shows the stacked structure of the divided core shown in FIG. 21A;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
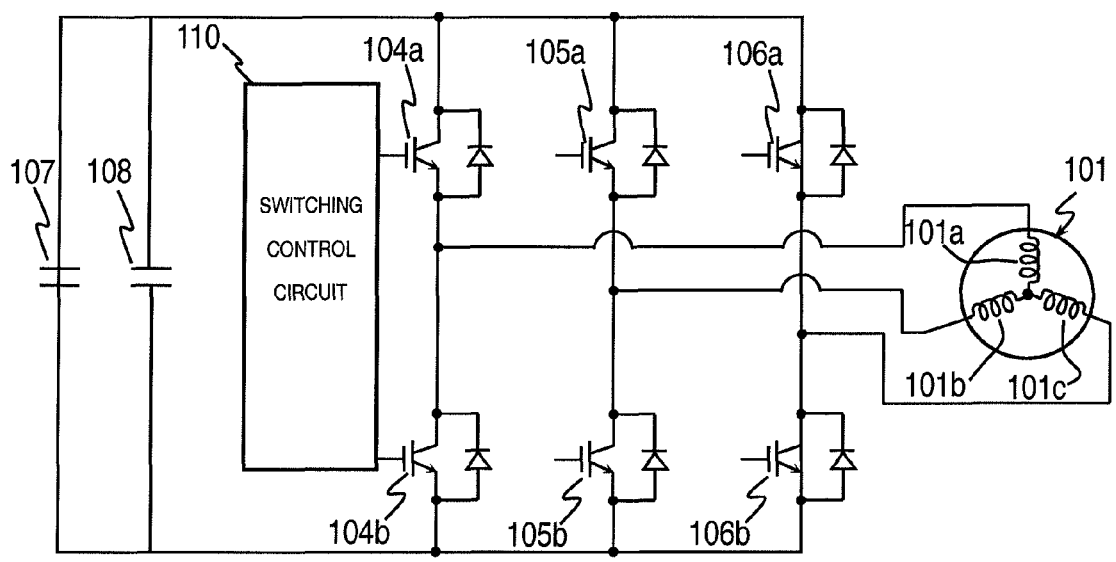
FIG. 1 is a schematic view of a control circuit of a motor in accordance with a first embodiment.

Referring initially to FIG. 1, a control circuit of a motor is schematically illustrated in accordance with a first embodiment. Although a three-phase induction motor is presented here as an example, the present invention is not limited to a three-phase induction motor. The three-phase induction motor 101 has three windings 101a, 101b, and 101c. Each winding 101a, 101b and 101c is provided with a pair of IGBT switching elements 104a, 104b, 105a, 105b, 106a and 106b, respectively. A drive current from a direct current power source 107 is supplied to each of the windings 101a, 101b and 101c by turning the IGBT switching elements 104a, 104b, 105a, 105b, 106a and 106b on and off. The switching action of the IGBT switch elements is controlled by a switching control circuit 110. A capacitor 108 serves to smooth the applied voltage and suppress ripple currents.

Figure 2:
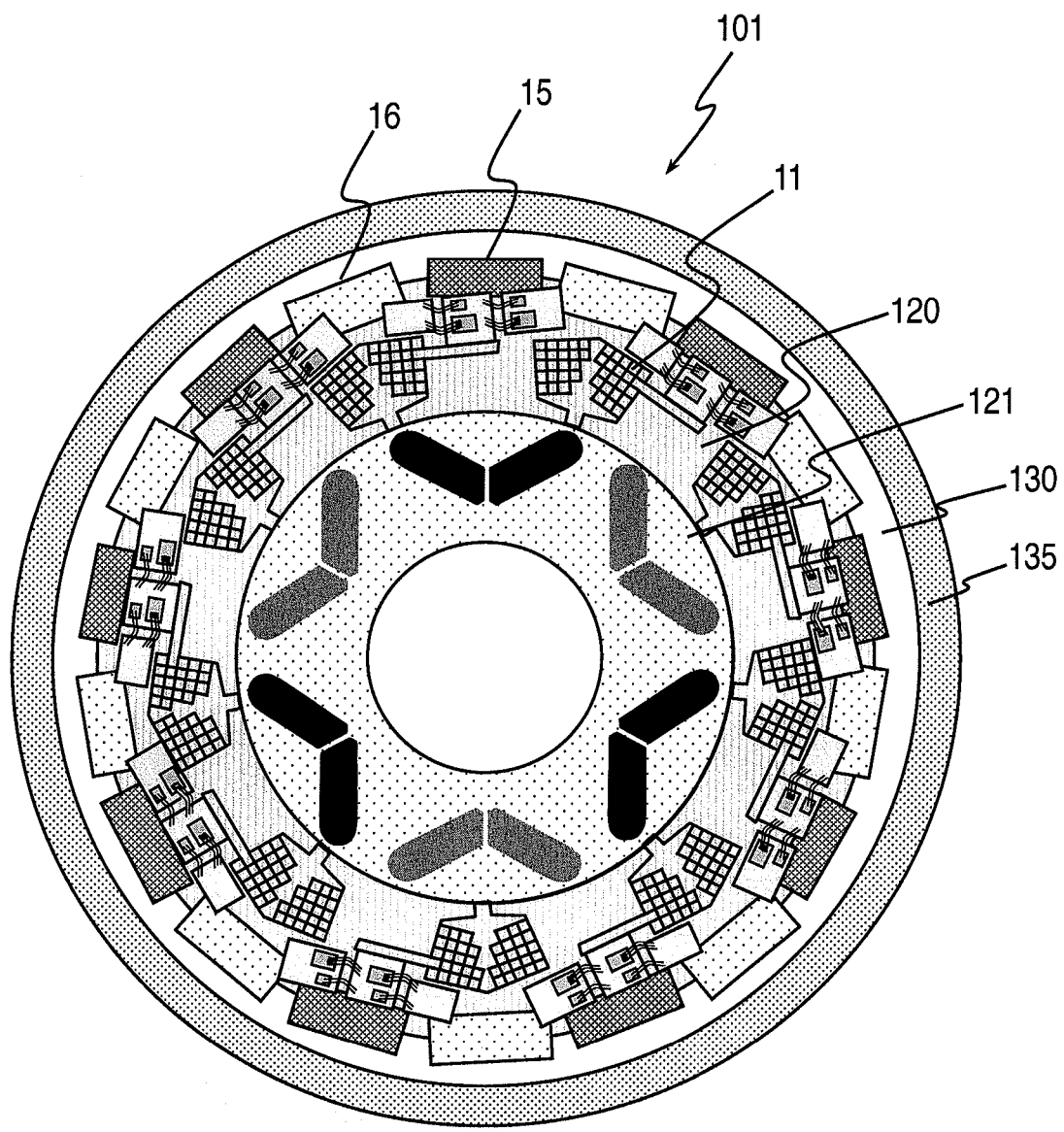
FIG. 2 is an axially facing end part of the motor in accordance with a first embodiment.
Figure 3:
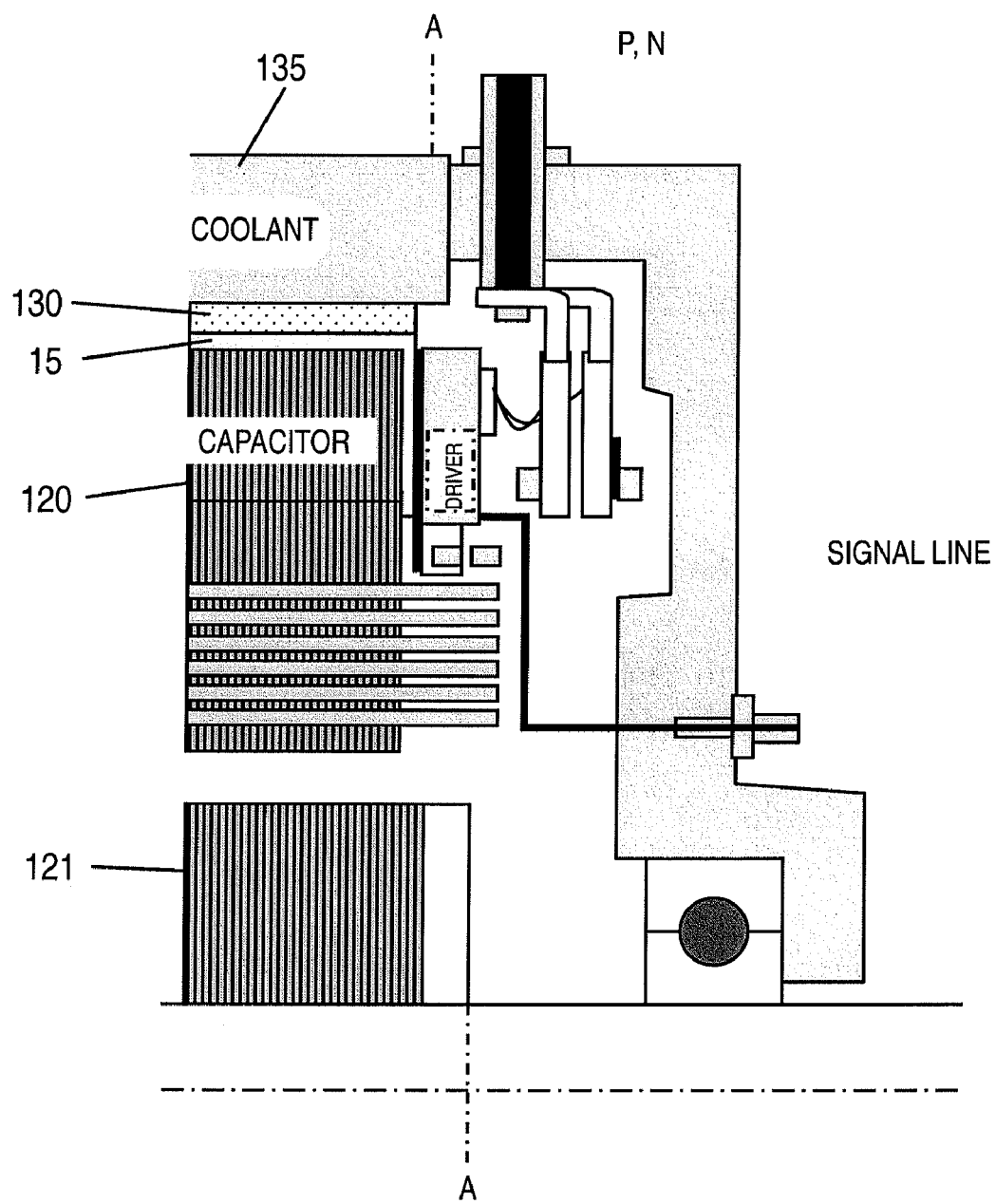
FIG. 3 is a cross sectional view of an end part of the motor in accordance with a first embodiment.

FIG. 2 shows an axial end part of the motor 101 as viewed along a direction of a rotational axis. The motor 101 basically has a stator 120 and a rotor 121. The stator 120 has teeth around which a wire is wound to form a coil 11. As will be explained later, a negative external electrode 15 and a positive external electrode 16 are provided on an external circumferential portion of the stator 120 (i.e., on an outside of a back yoke). The stator 120 is connected to an outside motor case 135 through a molded resin part 130. FIG. 3 is a cross sectional view of an end portion of the motor 101. As will be explained later, the stator 120 is provided with the ability to function as a capacitor. Electrode parts (not shown) provided on the stator 120 are electrically connected to an external circuit (e.g., a driver or a switching element circuit for driving the motor) through the external electrodes 15 and 16.

The constituent features of the capacitor 108 shown in FIG. 1 and the stator 120 will now be explained in detail with reference to FIGS. 4 to 31.

First Embodiment

Figure 4:
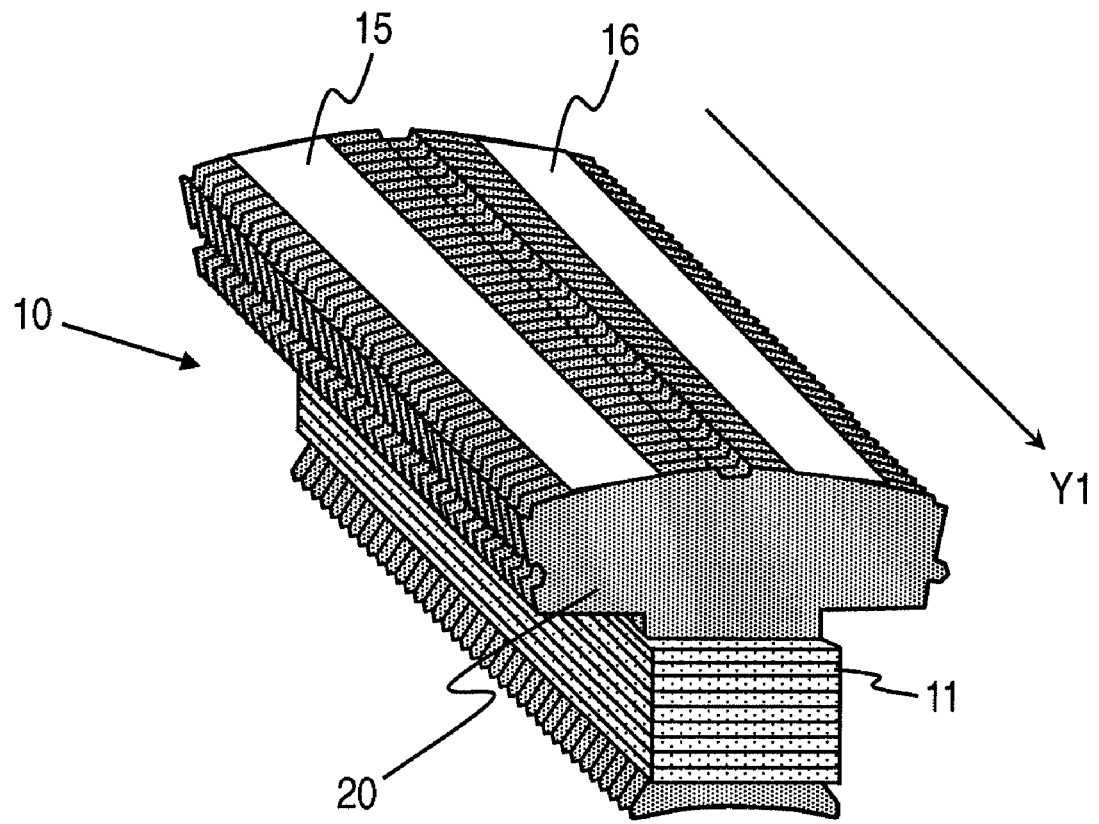
FIG. 4 is a perspective view of a divided core of a stator in accordance with a first embodiment.
Figure 5:
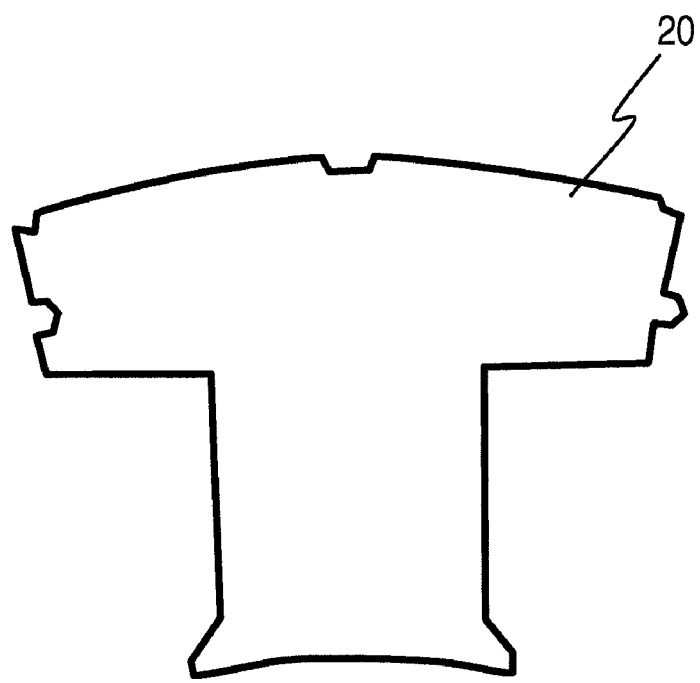
FIG. 5 is an axial view of one of the magnetic steel plates of the stator.

FIG. 4 shows a divided core 10 that forms part of the stator 120. The divided core 10 includes a plurality of magnetic steel plates 20 that are stacked along the direction of the arrow Y1 shown in FIG. 4. FIG. 5 is an axial end view of one of the magnetic steel plates 20. The relative permeability of the magnetic steel plates 20 needs to be a somewhat large value, e.g., 1000 or higher, in order for the electrodes to concentrate the motor magnetic flux. A wire is wound onto a tooth section 10*a* of the divided core 10 so as to form a coil 11. As seen in FIG. 2, the stator 120 has an overall cylindrical shape by arranging a plurality of divided cores 10, structured as shown in FIG. 4, in a circular fashion. The stator 120 is employed in, for example, a drive motor used to drive an electric car or a hybrid car.

In a conventional stator, the magnetic steel plates are stacked with an insulating layer is arranged between adjacent magnetic steel plates. In a motor in accordance with the first embodiment, the steel magnetic plates 20 are stacked with a high-permittivity dielectric material sandwiched between adjacent magnetic steel plates 20 in order to provide the stator 120 with a capacitor function. Since the stator 120 is provided with a capacitor function, this type of stator can be called an "integrated capacitor type stator."

Figure 6:
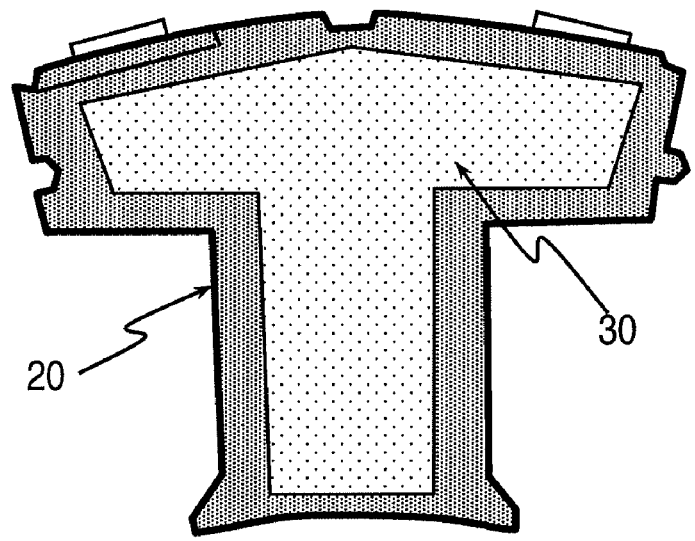
FIG. 6 is an axial view showing the shape of the dielectric material sandwiched between the magnetic steel plates.

FIG. 6 shows the shape of the dielectric material 30 sandwiched between the magnetic steel plates 20. The dielectric material 30 has generally the same shape (T-shape) as one magnetic steel plate 20, except smaller. The dielectric material 30 can be a sheet like entity that contains a dielectric substance. Since a voltage will be applied across the electrodes and between the steel magnetic plates 20, the insulation withstand voltage of the dielectric material 30 needs to be a somewhat large value, e.g., 10V/μm or higher. The relative permittivity of the dielectric material 30 also needs to be a somewhat large value, e.g., 1 or higher, because the capacitor needs to have a high electrostatic capacity (capacitance). It is also feasible to use a separate external capacitor in conjunction with the capacitor function of the stator 120 in order to secure the necessary electrostatic capacity.

As shown in FIG. 4, a negative external electrode 15 and a positive external electrode 16 are provided on an external circumferential portion (an outside portion of a back yoke) of the divided core 10. The external electrodes 15 and 16 serve to connect the capacitor formed by the magnetic steel plates 20 and the dielectric material 30 to a circuit that is connected to the motor. As will be explained later, the magnetic steel plates 20 can be positioned and secured by the connection of the external electrodes 15 and 16 to the magnetic steel plates 20. The electrode parts of the magnetic steel plates 20, which are connected to the external electrodes 15 and 16, will now be explained with reference to FIGS. 7A and 7B.

Figure 7A:
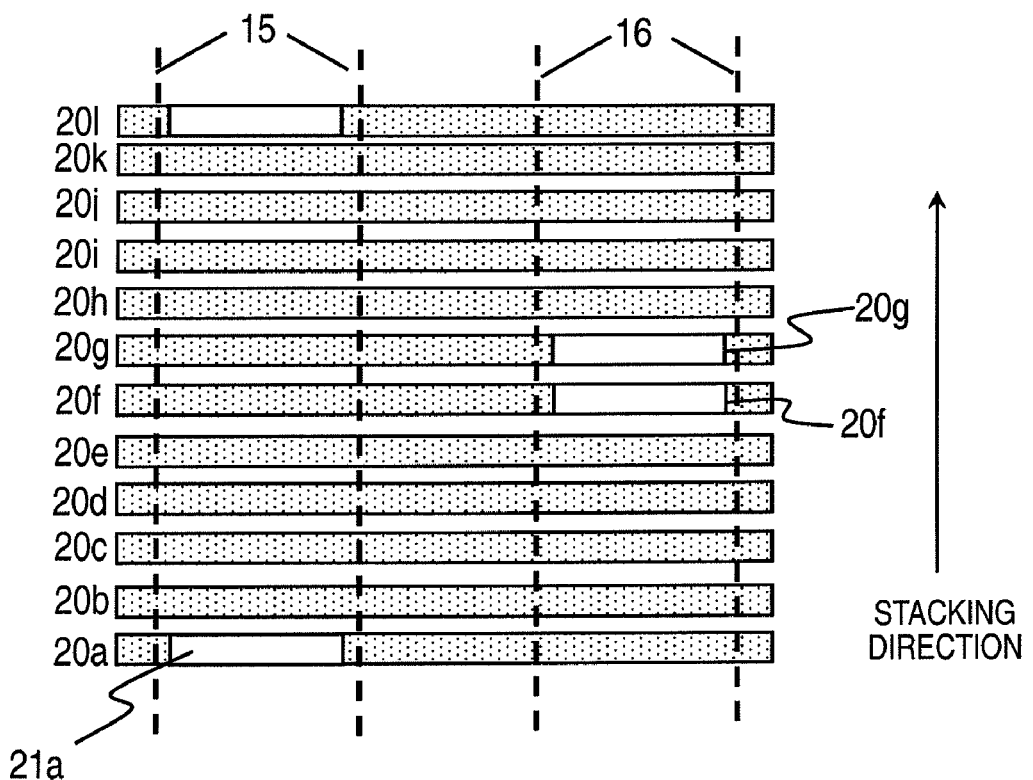
FIG. 7A shows the divided core shown in FIG. 4 with the external electrodes removed as viewed from the outside in a radially inward direction.

FIG. 7A shows an example of an arrangement of the electrode parts (internal electrodes) of the magnetic steel plates 20 of the divided core 10 shown in FIG. 4 when viewed from the outside in a radially inward direction with the external electrodes 15 and 16 removed. For purposes of illustration, FIG. 7A only shows twelve of the magnetic steel plates 20 (20*a* to 20*l*) that make up the stator 120. However, the actual number of magnetic steel plates 20 depends on the particular motor. The reference letters of the magnetic steel plates 20 progress in alphabetical order in accordance with the order in which the magnetic steel plates are stacked. Although not shown in FIG. 7A, the dielectric material 30 is disposed between each of the stacked magnetic steel plates 20.

Figure 7B:
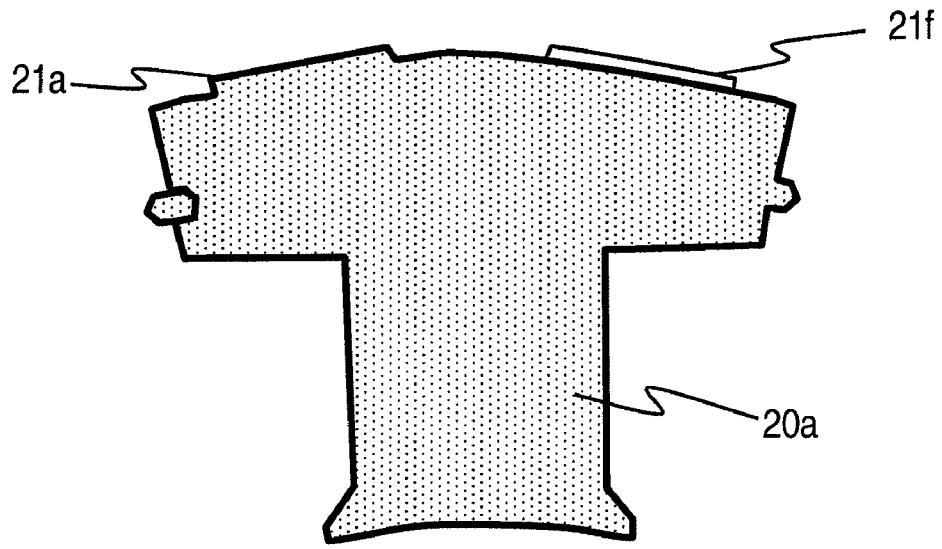
FIG. 7B is an axial view showing the shape of the magnetic steel plate.

FIG. 7B shows the shape of an electrode part 21*a* of a magnetic steel plate 20*a*. Since the external electrodes 15 and 16 are provided on the radially outward facing side of the stator (back yoke) as shown in FIG. 4, the electrode part 21*a*, too, is provided on the radially outward facing side of the magnetic steel plate 20*a* so that it can connect to one of the external electrodes. In particular, the electrode part 21*a* is connected to the negative external electrode 15.

In the example shown in FIG. 7A, an electrode part (internal electrode) for connecting to the positive external electrode 16 is provided on the magnetic steel plate 20*f*. Thus, there are four magnetic steel plates 20*b* to 20*e* disposed between the magnetic steel plate 20*a* (negative magnetic steel plate) having the electrode part 21*a* and the magnetic steel plate 20*f* (positive magnetic steel plate) having the electrode part 21*f*. FIG. 7B shows both the electrode part 21*a* of the magnetic steel plate 20*a* and the electrode part 21*f* of the magnetic steel plate 20*f*. Hereinafter, electrode parts that connect to the positive external electrode 16 will be called "positive electrode parts" and electrode parts that connect to the negative electrode 15 will be called "negative electrode parts."

By arranging a plurality of magnetic steel plates (20*b* to 20*e*) that do not have an electrode part between the magnetic steel plate 20*a* on which the electrode part 21*a* connected to the negative external electrode 15 is provided and the magnetic steel plate 20*f* on which the electrode part 21*f* connected to the positive external electrode 16 is provided, the required withstand voltage of the dielectric material 30 disposed between the magnetic steel plates 20 can be decreased. For example, if a voltage of 300 V is to be applied between electrode parts, then the withstand voltage of the dielectric material 30 between the adjacent magnetic steel plates 20*a* and 20*b* will have to be 300 V if a negative electrode part is provided on the magnetic steel plate 20*a* and a positive electrode part is provided on the magnetic steel plate 20*b*. However, if the positive electrode part is provided on the magnetic steel plate 20*f*, then five pieces of dielectric material 30 will exist between the magnetic steel plate 20*a* and the magnetic steel plate 20*f* and the required withstand voltage of the dielectric material 30 between any adjacent pair of magnetic steel plates will be 60 V (300 V/5).

In other words, by providing the electrode parts on the magnetic steel plates such that a plurality of magnetic steel plates exists between any positive electrode part and the nearest negative electrode part, the required withstand voltage of the dielectric material 30 between adjacent magnetic steel plates 20 can be decreased. Since the dielectric material 30 can have a smaller withstand voltage, the thickness of the dielectric material 30 can also be smaller. As a result, the size of the motor can be prevented from increasing due to a need for a dielectric material having a larger thickness and a sufficient number of magnetic entities to ensure the performance of the motor can be provided even when the dimension in the stacking direction of the magnetic entities is limited. Conversely, even if the withstand voltage the dielectric material 30 between each pair of adjacent magnetic steel plates 20 is small, a capacitor having a large withstand voltage can be formed between the electrode parts by connecting the plurality of capacitors formed by magnetic steel plates 20*a* to 20*f* together in series.

When the number of capacitors connected in series is increased, i.e., when the number of magnetic steel plates existing between the magnetic steel plate on which the positive electrode part is provided and the magnetic electrode plate on which the negative electrode part is provided is increased, a larger withstand voltage can be obtained but the capacitance of the capacitor decreases. Consequently, it is necessary to determine a number of capacitors connected in series that is appropriate based on the withstand voltage and the capacitance.

Since there a plurality of the magnetic steel plates 20 making up the stator 120, it is preferable to provide electrode parts for connecting to the external electrodes 15 and 16 on other magnetic steel plates as well. In the example shown in FIG. 7A, an electrode part for connecting to the positive external electrode 16 is provided on the magnetic steel plate 20g. The reason for providing a positive electrode part on the magnetic steel plate 20g is that a high voltage (e.g., 300 V) would exist between the magnetic steel plate 20g and the magnetic steel plate 20f if a negative electrode part (an electrode part positioned to connect to the negative external electrode 15) was provided on the magnetic steel plate 20g. A negative electrode part corresponding to the positive electrode part 21g of the magnetic steel plate 20g is provided on the magnetic steel plate 20l such that four magnetic steel plates without electrode parts exist there-between. Thus, the voltage (electric potential) sequentially increases as one moves from the magnetic steel plate 20a toward the magnetic steel plate 20f and sequentially decreases as one moves from the magnetic steel plate 20g toward the magnetic steel plate 20l.

As explained previously, in a motor in accordance with the first embodiment, the stator 120 is imparted with a capacitor function by providing the dielectric materials 30 between the magnetic steel plates 20 forming the divided cores 10 of the stator 120. Since the stator 120 of the motor 101 is made up of the divided cores 10 arranged in an annular fashion, it is necessary to join adjacent divided cores 10 together such that the magnetic steel plates having a positive electric potential do not contact the magnetic steel plates having a negative electric potential.

Figure 8:
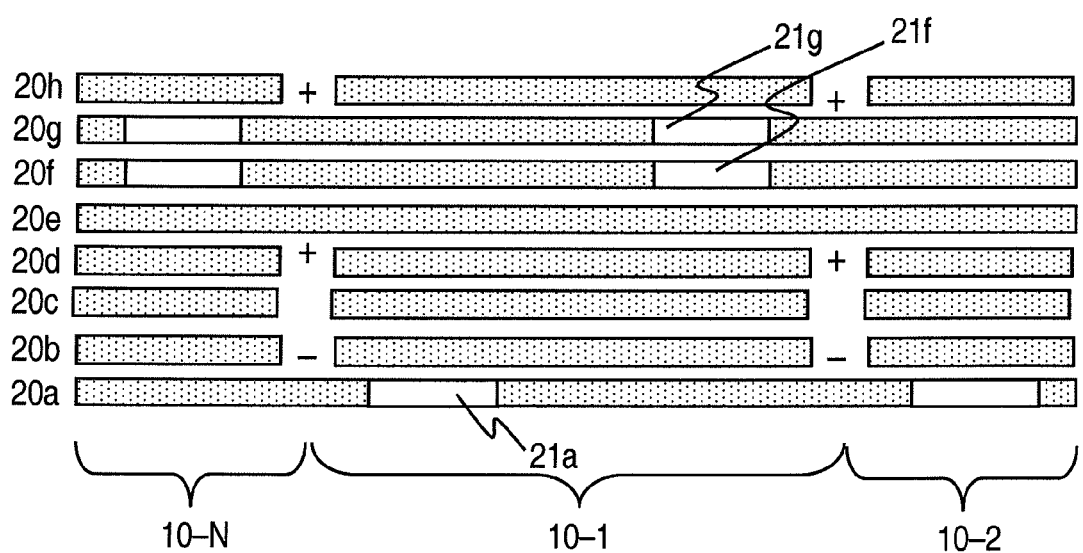
FIG. 8 shows an example of a method of making magnetic steel plates having the same potential contact one another between adjacent divided cores.

Therefore, in the motor according to the first embodiment, adjacent divided cores 10 are joined such that magnetic steel plates 20 having the same electric potential contact each other. FIG. 8 shows an example of how the adjacent divided cores 10-1, 10-2, and 10-N (N is the total number of divided cores) can be configured such that magnetic steel plates 20 having the same electric potential contact one another. The magnetic steel plates having a positive electric potential contact one another, and the magnetic steel plates having a negative electric potential contact one another. The other magnetic steel plates do not contact one another.

The method of securing the divided cores 10 (stator 120) will now be explained. If the positive electric potential is a high voltage exceeding, for example, 50 V, then it is preferable to secure the stator 120 to the motor case 135 with the molded resin part 130, as shown in FIG. 2, or the like in order to ensure sufficient electrical insulation. Conversely, if the positive electric potential is low, e.g., below 50 V, then the negative electric potential is set as the ground potential. In such a case, it is preferable for the negative external electrode 15 and the radially outward faces of the magnetic steel plates to be secured to the motor case 135 existing around the outside of the stator 120 (back yoke portion) without molded resin 130 disposed there-between. Meanwhile, the positive external electrode 16 is insulated from the motor case 135 with molded resin or the like. In this way, short circuiting between electrodes can be prevented and the stator 120 can be fixed to the motor case 135.

In a motor in accordance with the first embodiment, the stator 120 is made of a plurality of the stacked magnetic steel plates (magnetic entities) 20. The stator 120 is imparted with a capacitor function by arranging the dielectric material 30 between the magnetic steel plates 20 and using the magnetic steel plates 20 as electrodes. In this way, a stator of a motor and a capacitor can be formed as an integral unit and the overall size of a system containing the capacitor and the motor can be reduced. Also, a voltage smoothing effect can be obtained by providing the stator with a capacitor function.

In a motor in accordance with the first embodiment, the electrode parts for connecting to the external electrodes are provided on the back yoke side of the magnetic steel plates 20. As a result, the occurrence of eddy current loss caused by magnetic flux in the vicinity of the coil 11 can be suppressed.

Moreover, in the motor according to the first embodiment, the electrode parts are provided on the magnetic steel plates 20 such that a plurality of the magnetic steel plates (magnetic entities) is disposed between a magnetic steel plate having the positive electrode part and a magnetic steel plate having a negative electrode. As a result, capacitors made up of magnetic steel plates 20 and the dielectric material 30 can be connected in series and the withstand voltage of the capacitors can be increased.

In the motor according to the first embodiment, either the positive electrode parts or the negative electrode parts are secured to the motor case. As a result, short circuiting between electrodes can be prevented and the stator 120 can be fixed to the motor case.

In the motor according to the first embodiment, the stator 120 is made up of a plurality of the divided cores 10 with adjacent ones of the divided cores 10 being arranged such that the magnetic steel plates 20 having the same electric potential contact one another. As a result, the divided cores 10 can be arranged without providing an insulating material or gaps in-between and a small high-performance motor can be obtained.

Figure 9:
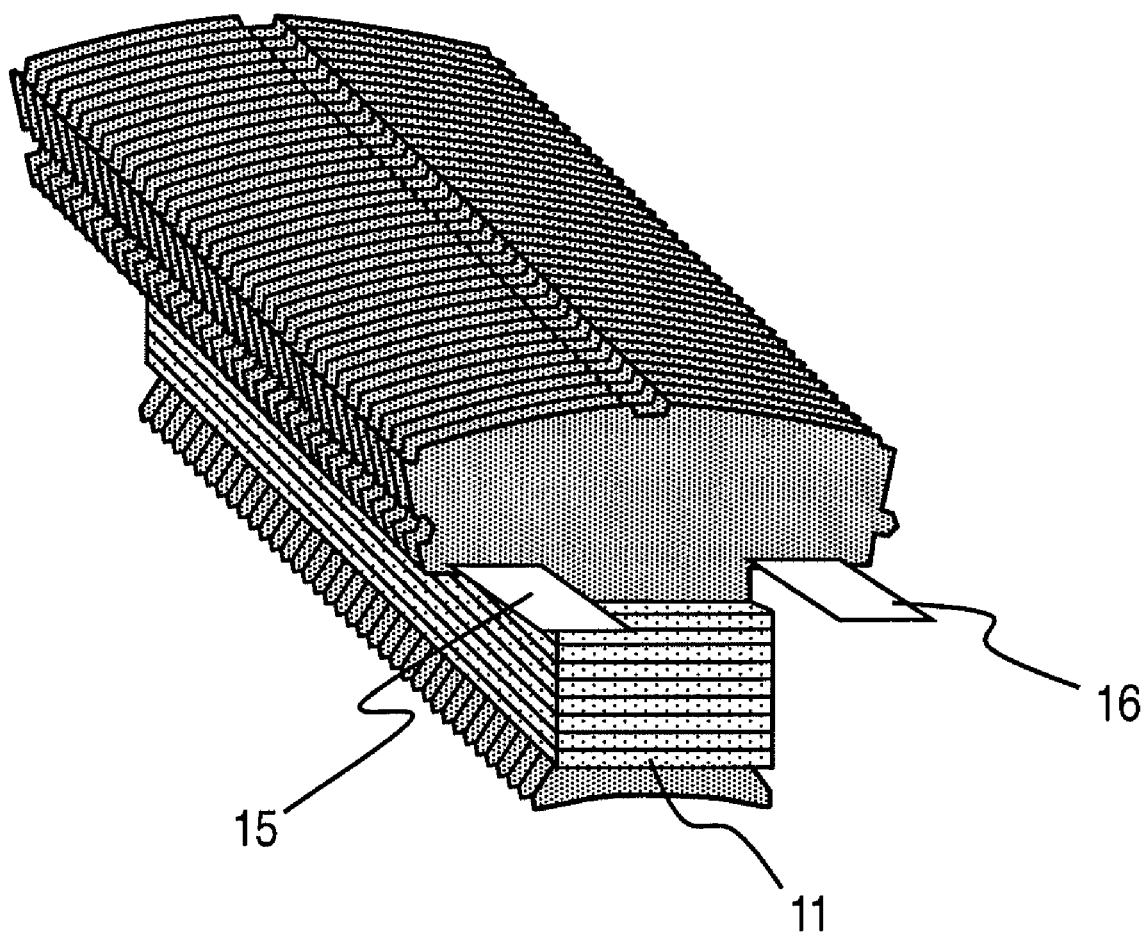
FIG. 9 is a perspective view of an example in which the external electrodes are provided in a position close to the tooth (i.e., on a radially inward side of the back yoke)

Although the first embodiment presents the external electrodes 15 and 16 as being provided on the radially outward side of the back yoke of the stator 120, it is also acceptable to provide the external electrodes 15 and 16 in a different position. FIG. 9 shows an example in which the external electrodes 15 and 16 are provided in a position close to the tooth 10a (i.e., on the radially inward side of the back yoke). In the example shown in FIG. 9, it is necessary for the external electrodes 15 and 16 to be insulated from the coil 11.

Second Embodiment

Figure 10:
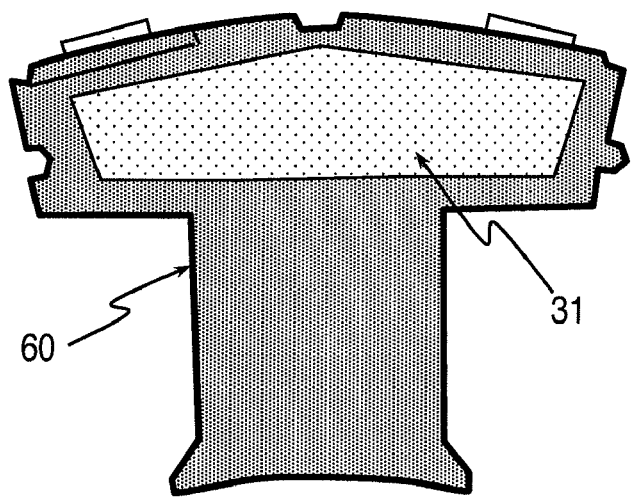
FIG. 10 is an axial view showing the shapes of a dielectric material and an insulating material arranged between adjacent magnetic steel plates.

Referring now to FIG. 10, a dielectric material 31 and an insulating material 60 is illustrated in accordance with a second embodiment. The dielectric material 31 and the insulating material 60 replaces the dielectric material 30 of the first embodiment. In view of the similarity between the first and second embodiments, the descriptions and illustrations of the parts of the second embodiment that are identical to the parts of the first embodiment will be omitted for the sake of brevity.

In the motor according to the first embodiment, the shape of the dielectric material 30 is generally the same as the shape of one magnetic steel plate 20 but smaller, as shown in FIG. 6. Thus, the dielectric material 30 exists in the spaces between adjacent magnetic steel plates 20 not only at the radially outward portion of the stator 120 (back yoke portion) but also at the tooth portions (radially inward portion) of the stator 120. In a motor according to a second embodiment, a dielectric material 31 is provided in a space between the back yoke portions of adjacent magnetic steel plates 20 and an insulating material 60 is provided in a remaining space.

FIG. 10 shows the shapes of the dielectric material 31 and the insulating material 60 arranged between adjacent magnetic steel plates 20. The dielectric material 31 is provided between the back yoke parts (radially outward portions) of the magnetic steel plates 20 and the insulating material 60 is provided between the tooth parts where the coil 11 is wound. The dielectric material 31 and the insulating material 60 can, for example, be formed on a single sheet-like member. It is also acceptable to form the insulating material 60 as a sheet and then apply the dielectric material 31 onto the sheet. Providing the insulating material 60 in the tooth portion of the divided core 10 where the coil 11 is wound enables the occurrence of eddy currents to be suppressed.

In the motor according to the second embodiment, the dielectric material 31 is provided in a portion of the space between adjacent magnetic steel plates 20 that is close to the electrode parts of the magnetic steel plates 20 (i.e., the portion of the space corresponding to the back yoke portions of the magnetic steel plates 20) and the insulating material 60 is provided in a portion of the space that is close to a position where the coil 11 is wound. As a result, the stator 120 can be imparted with a capacitor function and the occurrence of eddy currents can be suppressed.

Third Embodiment

Figure 11:
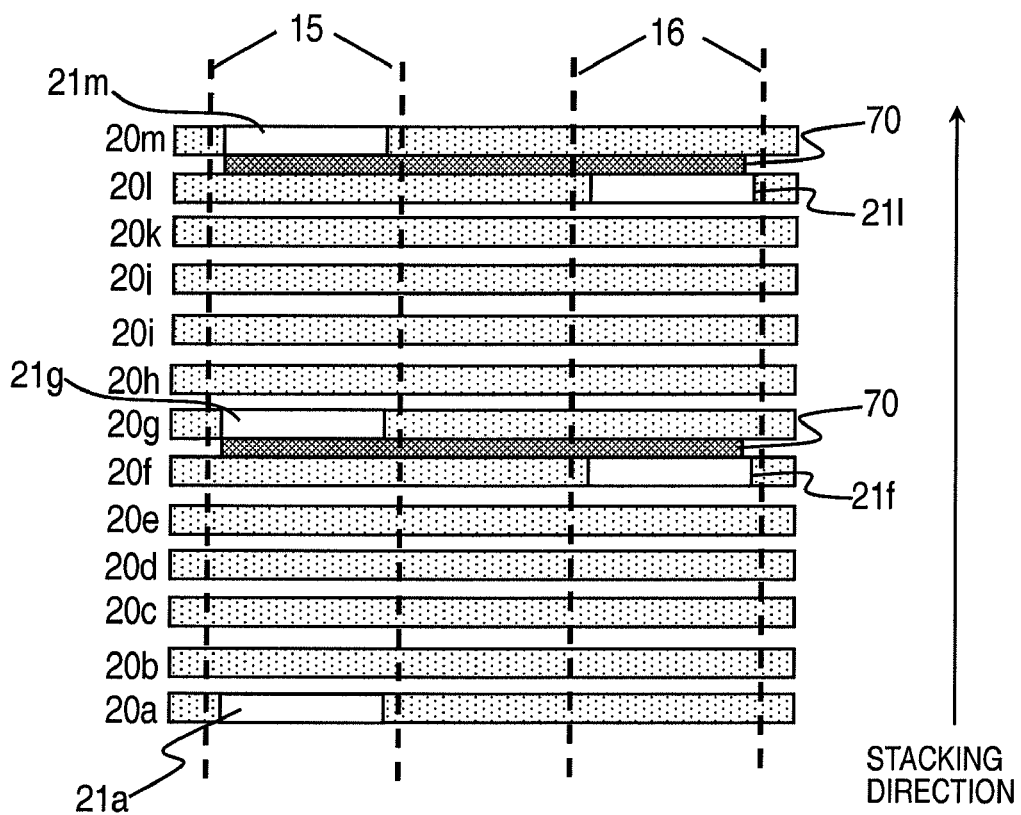
FIG. 11 shows an example of how the electrode parts (internal electrodes) of the magnetic steel plates are arranged in the motor according to the third embodiment when viewed from the outside of the stator in a radially inward direction.

Referring now to FIG. 11, electrode parts (internal electrodes) of the magnetic steel plates 20 are illustrated in accordance with a third embodiment. In view of the similarity between the first and third embodiments, the descriptions and illustrations of the parts of the third embodiment that are identical to the parts of the first embodiment will be omitted for the sake of brevity.

In the motor according to the first embodiment, as shown in FIG. 7A, an electrode part 21*f* that connects to the positive external electrode 16 is provided on the magnetic steel plate 20*f* and an electrode 21*g* provided on an adjacent magnetic steel plate 20*g* is also positioned to connect to the positive external electrode 16. In a motor according to a third embodiment, the electrode part 21*g* is positioned to be connected to the negative external electrode 15, and a high withstand voltage insulating material 70 is provided between the adjacent magnetic steel plates 20*f* and 20*g*.

FIG. 11 shows an example of how the electrode parts (internal electrodes) of the magnetic steel plates 20 are arranged in the motor according to the third embodiment when viewed from the outside of the stator 120 in a radially inward direction. For purposes of illustration, FIG. 11 only shows fourteen of the magnetic steel plates 20 (20*a* to 20*n*) that make up the stator 120. However, the actual number of magnetic steel plates 20 depends on the particular motor.

Since the electrode part 21*g* of the magnetic steel plate 20*g* is positioned to connect to the negative external electrode 15, a high voltage (e.g., 300 V) will exist between the magnetic steel plate 20*f* (which has a positive potential) and the magnetic steel plate 20*g* (which has a negative potential). Therefore, an insulating material 70 having a high withstand voltage is provided between the magnetic steel plate 20*f* and the magnetic steel plate 20*g* instead of a dielectric material.

A positive electrode part 21*l* corresponding to the negative electrode part 21*g* of the magnetic steel plate 20*g* is provided on the magnetic steel plate 20*l* such that four magnetic steel plates without electrode parts exist between the magnetic steel plate 20*g* and the magnetic steel plate 20*l*. Similarly, an electrode part 21*m* is provided on the magnetic steel plate 20*m* to connect to the negative external electrode 15. The magnetic steel plate 20*m* is adjacent to the magnetic steel plate 20*l* with the insulating material 70 having a high withstand voltage is provided between the magnetic steel plates 20*l* and 20*m*.

In the motor according to the third embodiment, a positive electrode part and a negative electrode part are arranged on adjacent magnetic steel plates 20 and an insulating material is provided between the magnetic steel plate on which the positive electrode part is arranged and the magnetic steel plate on which the negative electrode part is arranged. As a result, a situation can be prevented in which a high voltage is applied between two adjacent magnetic steel plates having a positive electrode part and a negative electrode part when a dielectric material is provided between the two magnetic steel plates with the positive and negative electrode parts, respectively.

Fourth Embodiment

Referring now to FIGS. 12A to 12C, electrode parts (internal electrodes) of the magnetic steel plates 20 are illustrated in accordance with a fourth embodiment. In view of the similarity between the first and fourth embodiments, the descriptions and illustrations of the parts of the fourth embodiment that are identical to the parts of the first embodiment will be omitted for the sake of brevity.

FIG. 12A shows an example of how the electrode parts (internal electrodes) of the magnetic steel plates 20 are arranged in the motor according to the fourth embodiment when viewed from the outside of the stator 120 in a radially inward direction. For purposes of illustration, FIG. 12A only shows eight of the magnetic steel plates 20 (20*a* to 20*h*) that make up the stator 120. However, the actual number of magnetic steel plates 20 depends on the particular motor. FIG. 12B shows the shape of an electrode part 22*a* of the magnetic steel plate 20*a*. FIG. 12C shows the shape of the electrode part 22*a* when viewed along the direction of the arrow Y2 shown in FIG. 12A.

In the motor according to the fourth embodiment, the electrode parts of the magnetic steel plates are bent over in the stacking direction of the magnetic steel plates (see FIG. 12C) in order to increase the amount of surface area of the electrode parts that is available to connect to the external electrodes 15 and 16, thereby facilitating the connection of the electrode parts to the external electrodes 15 and 16. In the example shown in FIG. 12A, the bent over portion of the electrode part 22*a* of the magnetic steel plate 20*a* extends into a region above the magnetic steel plate 20*c*.

It is necessary to insulate the bent over portion of the electrode part 22*a* from the other magnetic steel plates 20*b* and 20*c*. Therefore, it is preferable to provide an insulating material between the bent over portion of the electrode part 22*a* and the magnetic steel plates 20*b* and 20*c* as required.

In the motor according to the fourth embodiment, the electrode parts provided on the outward side of the back yoke are bent over such that a larger surface area is available for contact with the external electrodes 15 and 16. As a result, the connections between the electrode parts of the capacitor and the external electrodes can be accomplished more easily.

Fifth Embodiment

Figure 13:
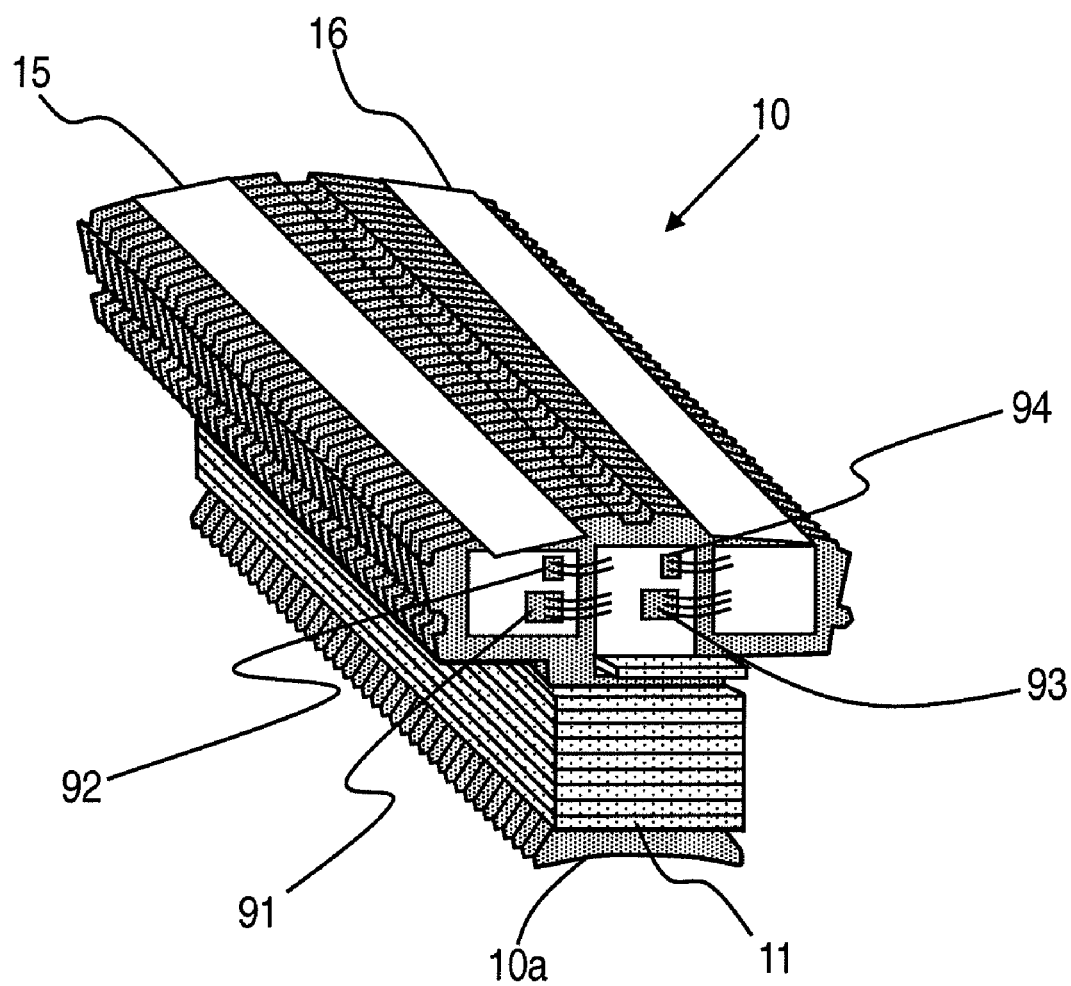
FIG. 13 is a perspective view of constituent features of a motor according to a fifth embodiment.

Referring now to FIG. 13, a divided core 10 of a motor is illustrated in accordance with a fifth embodiment. In view of the similarity between the first and fifth embodiments, the descriptions and illustrations of the parts of the fifth embodiment that are identical to the parts of the first embodiment will be omitted for the sake of brevity.

The difference with respect to the divided core shown in FIG. 4 is that a power module is arranged on an end face of the divided core 10. The power module includes switching elements 91 and 93 and diodes 92 and 94 arranged on an end face of the divided core 10. The power module is a constituent component of an inverter (electric power converting device) and the switching elements 91 and 93 are, for example, IGBTs.

In a motor according to this embodiment, the stator is provided with a capacitor function. By arranging the power module that is a component of an inverter on an end face of the divided core 10, the overall size of a system that includes a motor, an inverter, and a capacitor can be reduced. Additionally, the power module and the capacitor can be connected together with a minimum amount of inductance.

Although FIG. 13 only shows one divided core 10, the structures of all of the other divided cores are the same to make up a stator similar to the first embodiment.

Sixth Embodiment

Figure 14A:
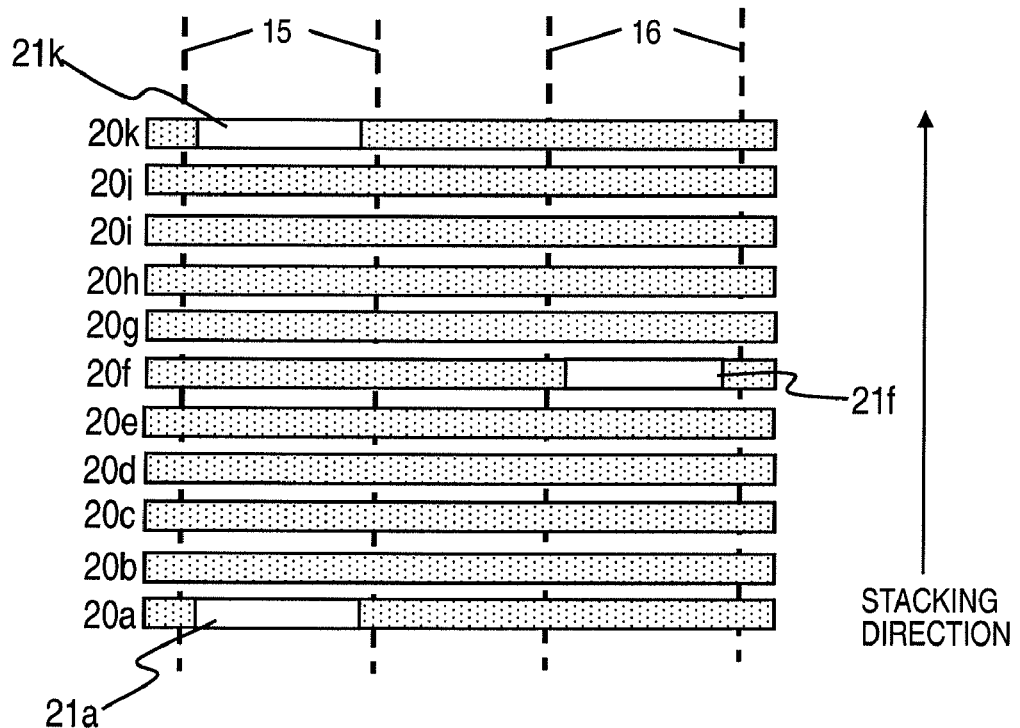
FIG. 14A shows an example of how the electrode parts (internal electrodes) of the magnetic steel plates are arranged in a motor according to a sixth embodiment when viewed from the outside of the stator in a radially inward direction.
Figure 14B:
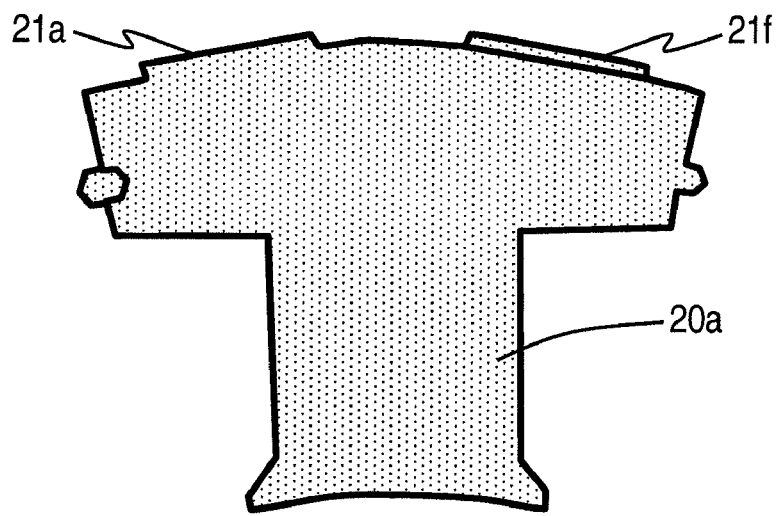
FIG. 14B is an axial view showing the shape of an electrode part of a magnetic steel plate of FIG. 14A.

Referring now to FIGS. 14A and 14B, electrode parts (internal electrodes) of the magnetic steel plates 20 are illustrated in accordance with a sixth embodiment. In view of the similarity between the first and sixth embodiments, the descriptions and illustrations of the parts of the sixth embodiment that are identical to the parts of the first embodiment will be omitted for the sake of brevity.

FIG. 14A shows an example of how the electrode parts (internal electrodes) of the magnetic steel plates 20 are arranged in the motor according to the sixth embodiment when viewed from the outside of the stator 120 in a radially inward direction. For purposes of illustration, FIG. 14A only shows eleven of the magnetic steel plates 20 (20a to 20k) that make up the stator 120. However, the actual number of magnetic steel plates 20 depends on the particular motor. FIG. 14B shows the shape of an electrode part 21a of a magnetic steel plate 20a. In an integrated capacitor type stator according to the sixth embodiment, the electrode part 21k of the magnetic steel plate 20k is positioned to connect to the negative external electrode 15.

In the sixth embodiment, similarly to the first embodiment, an electrode part 21a that connects to the negative external electrode 15 is provided on the magnetic steel plate 20a and an electrode part 21f that connects to the positive external electrode 16 is provided on the magnetic steel plate 20f. Another negative electrode part corresponding to the positive electrode part 21f of the magnetic steel plate 20f is the electrode part 21k provided on the magnetic steel plate 20k, which is arranged such that four magnetic steel plates without electrode parts exist there-between. Thus, the voltage sequentially increases as one moves from the magnetic steel plate 20a toward the magnetic steel plate 20f and sequentially decreases as one moves from the magnetic steel plate 20f toward the magnetic steel plate 20k. With this embodiment, the magnetic steel plates 20 can be used more efficiently because it is not necessary to provide adjacent magnetic steel plates having the same electric potential, as is done in the first embodiment (e.g., the magnetic steel plates 20f and 20g have the same electric potential).

Seventh Embodiment

Referring now to FIGS. 15A to 15D, 16A, 16B, 17, 18A and 18B, a seventh embodiment is illustrated in which elements comprising a magnetic steel plate 20 and a dielectric material 30 are used to form a stator. In view of the similarity between the first and seventh embodiments, the descriptions and illustrations of the parts of the seventh embodiment that are identical to the parts of the first embodiment will be omitted for the sake of brevity. A stator of a motor is formed in accordance with the seventh embodiment by combining a plurality of which the elements shown in FIGS. 15A to 15D in a manner similar to the first embodiment. In this seventh embodiment, the positive electrode parts and negative electrode parts are arranged such that the electric currents in each (any) pair of adjacent magnetic entities (magnetic steel plates) flow in opposing directions as the current flows from a positive electrode part to a negative electrode part.

Each of FIGS. 15A and 15B shows a positive element comprising a dielectric material 30 and a magnetic steel plate 20 that connects to a positive external electrode 16. Each of FIGS. 15C and 15D shows a negative element comprising a dielectric material 30 and a magnetic steel plate 20 that connects to a negative external electrode 15.

Of the entire surface of each of the magnetic steel plates 20, at least a portion thereof corresponding to the dielectric material 30 is coated with a conductive metal film having a high conductivity (e.g., copper, nickel, or tin). In the example shown in FIGS. 15A to 15D, the entire surface of each of the magnetic steel plates 20 is coated with the conductive metal film because the dielectric material 30 contacts substantially the entire surface of the magnetic steel plates 20. Since each magnetic steel plate 20 is coated with a conductive metal film having a smaller electrical resistance than the magnetic steel plate 20, electric current can flow through the entire portion where the coating exists. The idea of applying a conductive metal film can be adopted in any motor in accordance with any of the embodiments.

The magnetic steel plate 20 shown in FIG. 15A is provided with an electrode part on a lower left side face of the tooth part thereof. In this embodiment, the left side face of the tooth part corresponds to one of the circumferentially facing edge portions and "lower" means farther inward in the radial direction along the side face of the tooth part. The magnetic steel plate 20 shown in FIG. 15B is provided with an electrode part on a lower right side face of the tooth part thereof. In this embodiment, the right side face of the tooth part corresponds to the other of the circumferentially facing edge portions and "lower" means farther inward in the radial direction along the side face of the tooth part. In order to simplify the explanation, a unit comprising the magnetic steel plate 20 and the dielectric material 30 shown in FIG. 15A will be called an "element P1" and a unit comprising the magnetic steel plate 20 and the dielectric material 30 shown in FIG. 15B will be called an "element P2." Additionally, the electrode part of the element P1 will be called an "electrode 21P1" and the electrode part of the element P2 will be called an "electrode 21P2."

The magnetic steel plate 20 shown in FIG. 15C is provided with an electrode part on an upper right side face of the tooth part thereof. In this embodiment, the right side face of the tooth part corresponds to said other of the circumferentially facing edge portions and "upper" means farther outward in the radial direction along the side face of the tooth part. The magnetic steel plate 20 shown in FIG. 15D is provided with an electrode part on an upper left side face of the tooth part thereof. In this embodiment, the left side face of the tooth part corresponds to the one of the circumferentially facing edge portions and "upper" means farther outward in the radial direction along the side face of the tooth part. In order to simplify the explanation, a unit comprising the magnetic steel plate 20 and the dielectric material 30 shown in FIG. 15C will be called an "element N1" and a unit comprising the magnetic steel plate 20 and the dielectric material 30 shown in FIG. 15D will be called an "element N2." Additionally, the electrode part of the element N1 will be called an "electrode 21N1" and the electrode part of the element N2 will be called an "electrode 21N2."

Figure 16A:
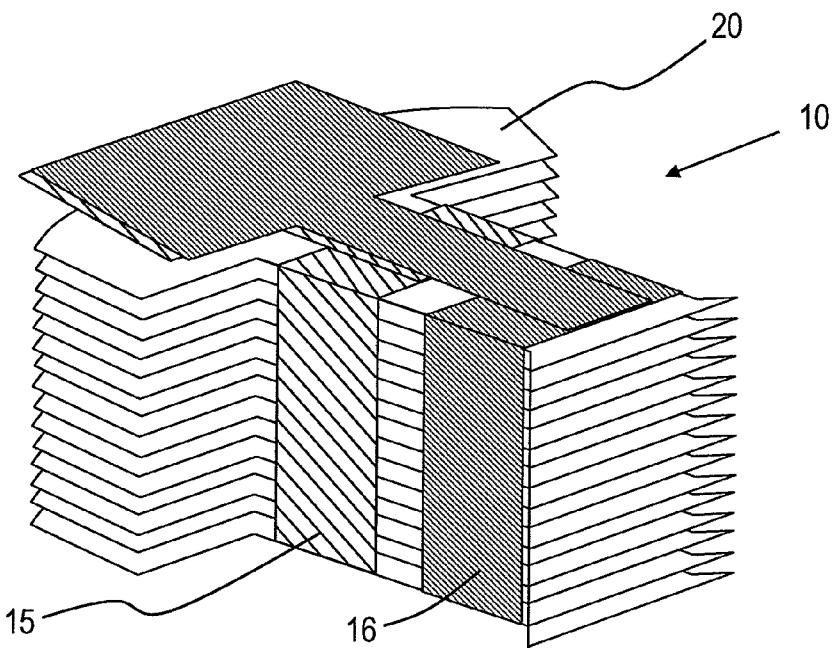
FIG. 16A is a perspective view of a divided core comprising a stack of the elements.
Figure 16B:
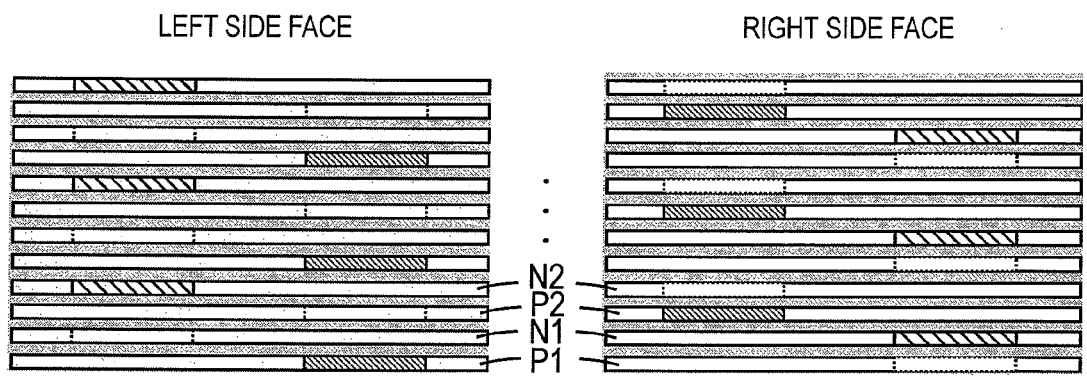
FIG. 16B shows the stacked structure of the divided core shown in FIG. 16A.

FIG. 16A is a perspective view of a divided core 10 comprising the elements P1, P2, N1, and N2 stacked onto one another. FIG. 16B shows the stacked structure of the divided core 10 shown in FIG. 16A. FIG. 16B shows the left side face and the right side face, respectively, of the tooth part of the divided core 10. On the left and right side faces of the tooth portion of the divided core 10, the portions of the side faces of the magnetic steel plates where an electrode part is not provided are insulated from the external electrodes 15 and 16. As shown in FIG. 16B, elements P1, N1, P2, and N2 are repeatedly stacked in order as listed. With this stacking arrangement, a first main capacitor is formed by the magnetic steel plate 20 having the electrode part 21P1, the dielectric material 30 of the element P1 and the magnetic steel plate 20 having an electrode part 21N1 of the adjacent element N1. Similarly, a second main capacitor is formed by the magnetic steel plate 20 having an electrode part 21P2, the dielectric material 30 of the element P2 and the magnetic steel plate 20 having an electrode part 21N2 of the adjacent element N2. A capacitor is also formed by the magnetic steel plate 20 having an electrode part 21N1, the dielectric material 30 of the element N1 and the magnetic steel plate 20 having an electrode part 21P2 of the adjacent element P2. However, the conductive surface area of the dielectric material, and thus, the capacitance is smaller than that of the main capacitors. In this way, the divided core 10 comprises a plurality of capacitors stacked on one another.

Figure 17:
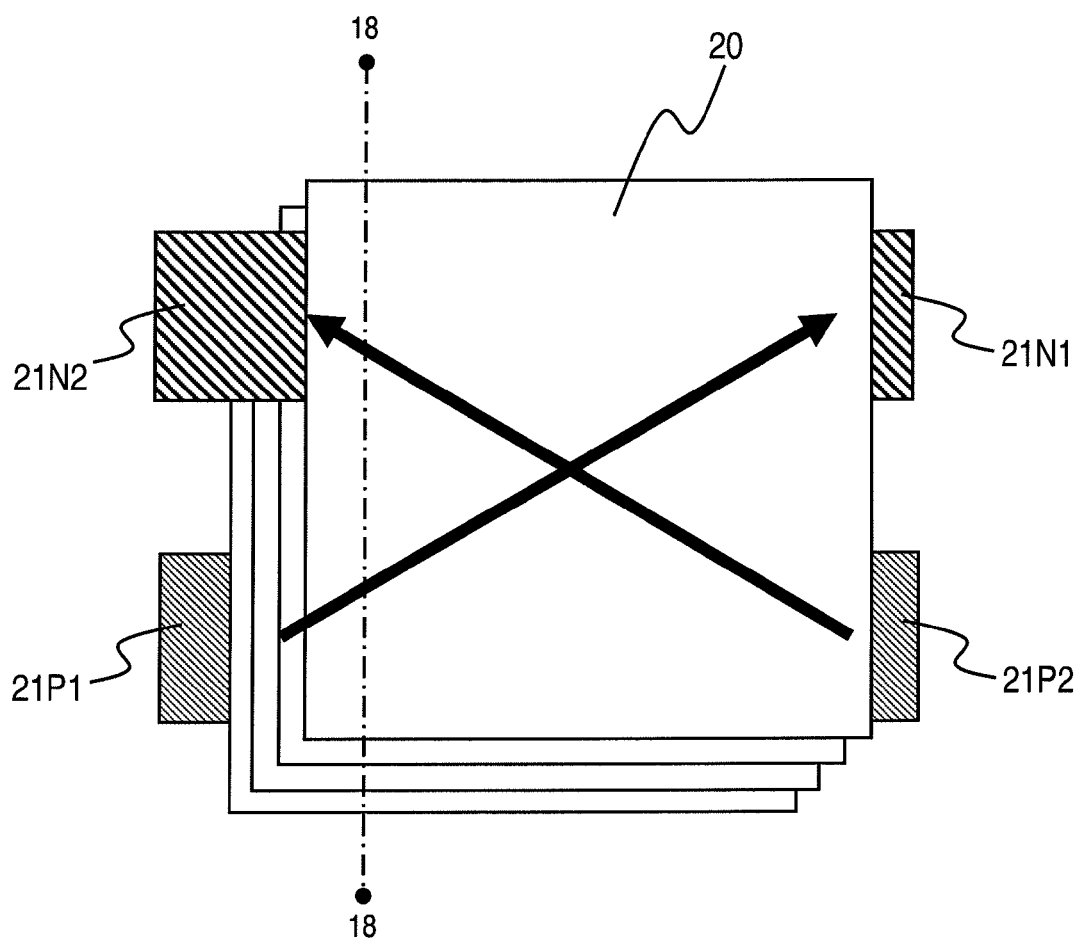
FIG. 17 shows the directions of the capacitor currents that flow in the divided core shown in FIGS. 15A to 15D and 16.

FIG. 17 shows the directions of the capacitor currents that flow in the divided core 10 shown in FIGS. 15A to 15D, 16A and 16B. The current paths of the first capacitor and the second capacitor are oriented in opposing directions relative to the circumferential direction of the stator and intersect each other along a radial direction. A radial direction is a direction oriented outward away from the center axis of the rotor. Thus, as shown in FIG. 17, the current flowing from the electrode part 21P1 of the element P1 to the electrode part 21N1 of the element N1 is oriented in a direction that intersects with the direction of the current flowing from the electrode part 21P2 of the element P2 to the electrode part 21N2 of the element N2. Consequently, the magnetic fluxes generated by the first and second capacitors are oriented in different directions, and thus, cancel each other out, enabling the total magnetic flux density resulting from electric current in the capacitors to be reduced. As a result, the occurrence of eddy currents in various parts of the magnetic steel plates 20 can be greatly reduced. The various parts in which eddy currents can occur are not limited to the circumferentially oriented eddy currents shown in FIGS. 18A and 18B (discussed below). For example, eddy currents can also occur in the stacked surfaces of the magnetic steel plates 20.

Figure 18A:
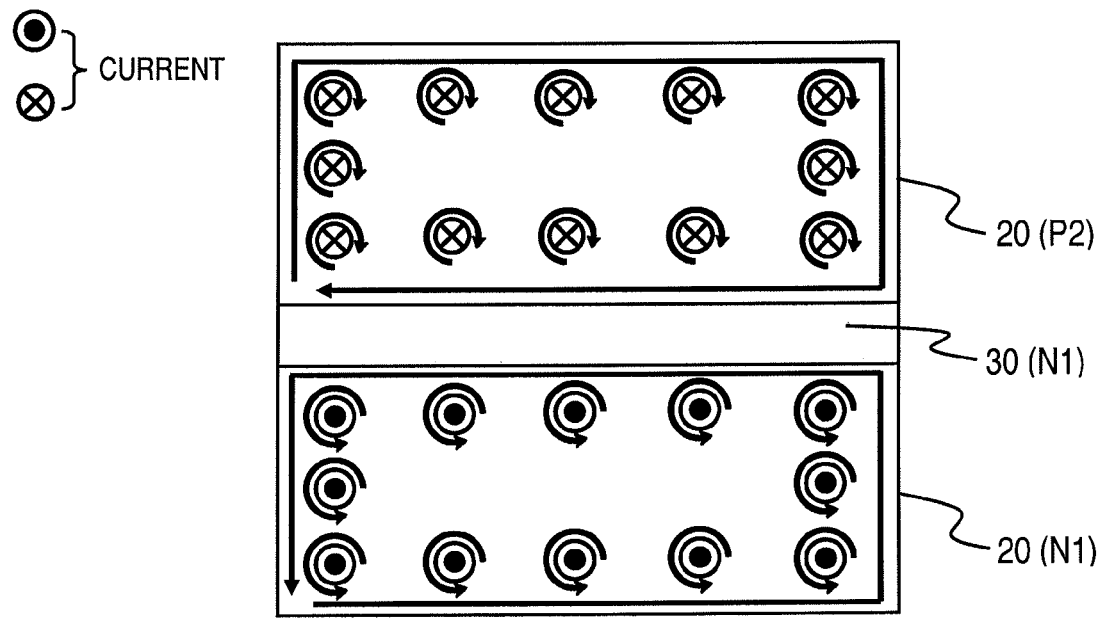
FIG. 18A is a cross sectional view along section line 18-18 of FIG. 17 showing the magnetic flux generated when the currents of the adjacent magnetic steel plates flow in opposing directions.
Figure 18B:
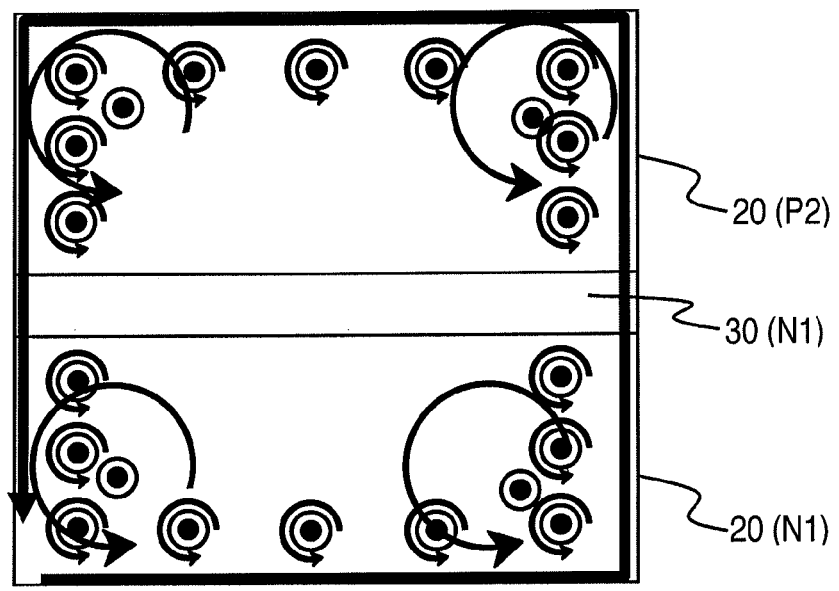
FIG. 18B is a cross sectional view along section line 18-18 of FIG. 17 showing the magnetic flux generated when the currents of the adjacent magnetic steel plates flow in the same direction.

FIGS. 18A and 18B are a cross sectional views of the divided core 10 taken along the section line 18-18 shown in FIG. 17. FIGS. 18A and 18B show the magnetic steel plate 20, the dielectric material 30 of the element N1 and the magnetic steel plate 20 of the element P2. In other words, FIGS. 18A and 18B show the portion between a first capacitor and a second capacitor. FIG. 18A shows the magnetic flux generated when the currents of the adjacent magnetic steel plates 20 flow in opposing directions, while FIG. 18B shows the magnetic flux generated when the currents of the adjacent magnetic steel plates 20 flow in the same direction. In FIGS. 18A and 18B, a black circular dot inside a larger circle indicates a current flowing from the back of the paper toward the front surface of the paper and an "X" inside a circle indicates a current flowing from the front surface of the paper toward the back of the paper. The arrows indicate the directions of magnetic flux.

When the currents of the magnetic steel plates 20 are oriented in the same direction in the conventional manner, large magnetic field loops develop as shown in FIG. 18B. Additionally, current concentrates in the corner portions of the magnetic steel plates, causing the temperature to rise at the corner portions. Conversely, when the currents of the magnetic steep plates 20 are oriented in opposing directions in the manner of the seventh embodiment, the development of large magnetic field loops is suppressed as shown in FIG. 18A and the total magnetic flux density can be decreased. Additionally, localized temperature increases do not occur because current does not concentrate in the corner portions of the magnetic steel plates 20.

Eighth Embodiment

Referring now to FIGS. 19A to 19G, a divided core structure of a motor is illustrated in accordance with an eighth embodiment. The divided core structure of this eighth embodiment is the same as the seventh embodiment, except that a power module has been added. In view of the similarity between this embodiment and the prior embodiments, the descriptions and illustrations of the parts of the eighth embodiment that are identical to the parts of the prior embodiments will be omitted for the sake of brevity. In this eighth embodiment, the positive electrode parts and negative electrode parts are arranged such that the electric currents in each (any) pair of adjacent magnetic entities (magnetic steel plates) flow in opposing directions as the current flows from a positive electrode part to a negative electrode part.

Figure 19A:
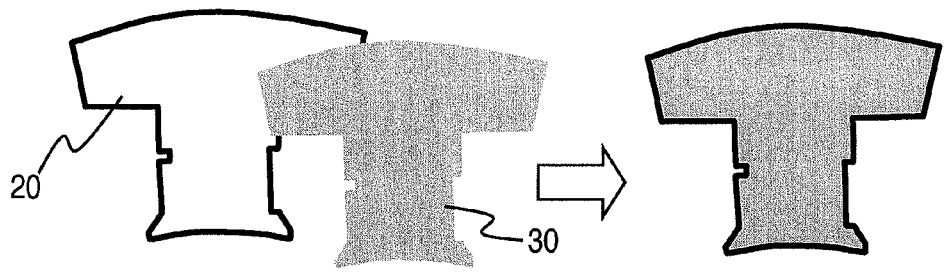
FIG. 19A shows one element of a divided core structure of a motor in accordance with an eighth embodiment that is the same as the seventh embodiment except that a power module having a switching element and a current rectifying element has been added.
Figure 19B:
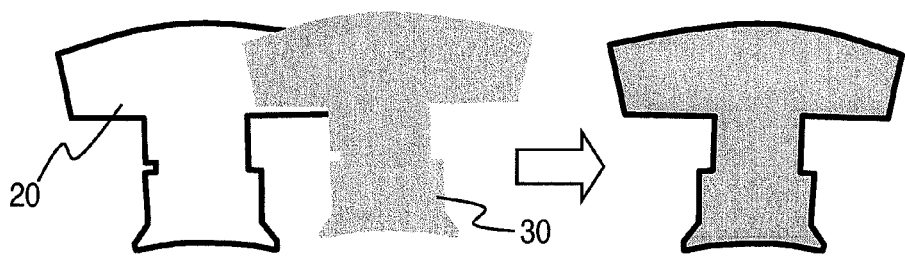
FIG. 19B shows another element of the divided core structure of the eighth embodiment.

The power module includes a switching element and a current rectifying element (e.g., a diode). FIG. 19A shows an element comprising a dielectric material 30 and a magnetic steel plate 20 connected to a positive external electrode. FIG. 19B shows an element comprising a dielectric material 30 and a magnetic steel plate 20 connected to a negative external electrode.

Figure 19C:
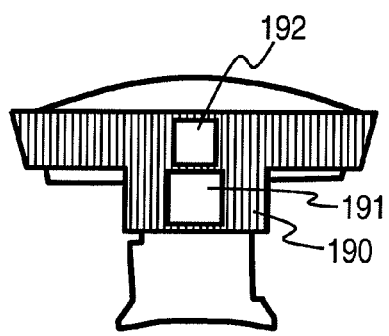
FIG. 19C shows another element of the divided core structure of the eighth embodiment.
Figure 19D:
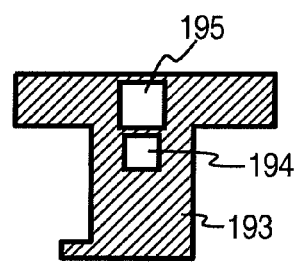
FIG. 19D shows another element of the divided core structure of the eighth embodiment.
Figure 19E:
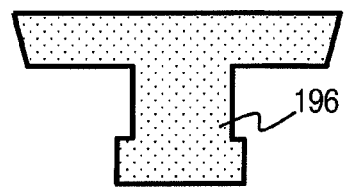
FIG. 19E shows another element of the divided core structure of the eighth embodiment.

FIG. 19C shows the negative external electrode 190, a chip 191 on which a negative electrode rectifying element is mounted, and a chip 192 on which a negative electrode switching element is mounted. FIG. 19D shows an output external electrode 193 that connects to the motor, a chip 194 on which a positive electrode rectifying element is mounted, and a chip 195 on which a positive electrode switching element is mounted. FIG. 19E shows the positive external electrode 196. The chip 192 carrying the negative electrode switching element and the chip 191 carrying the negative electrode rectifying element are mounted on the negative external electrode 190, and the chip 195 carrying the positive electrode switching element and the chip 194 carrying the positive electrode rectifying element are mounted on the output external electrode 193.

Figure 19F:
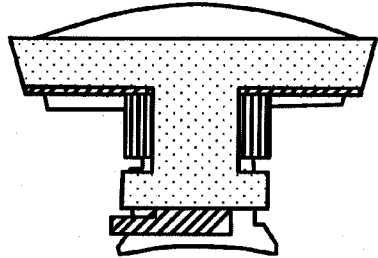
FIG. 19F another element of the divided core structure of the eighth embodiment.
Figure 19G:
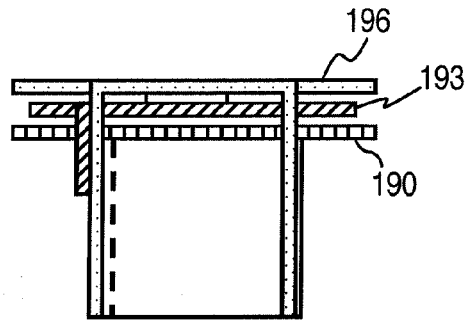
FIG. 19G another element of the divided core structure of the eighth embodiment.

FIG. 19F shows the negative external electrode 190 of FIG. 19C, the output external electrode 193 of FIG. 19D, and the positive external electrode 196 of FIG. 19E a stacked state. FIG. 19G shows the stacked structure of FIG. 19F when viewed along a stacking direction. As shown in FIG. 19F, the output external electrode 193 is mounted over the negative external electrode 190 and the positive external electrode 196 is mounted over the output external electrode 193.

Ninth Embodiment

Referring now to FIGS. 20A to 20D, 21A, 21B and 22, a divided core 10 of a motor is illustrated in accordance with a ninth embodiment. In view of the similarity between the first and ninth embodiments, the descriptions and illustrations of the parts of the ninth embodiment that are identical to the parts of the first embodiment will be omitted for the sake of brevity. In this ninth embodiment, the positive electrode parts and negative electrode parts are arranged such that the electric currents in each (any) pair of adjacent magnetic entities (magnetic steel plates) flow in opposing directions as the current flows from a positive electrode part to a negative electrode part.

Figure 20A:
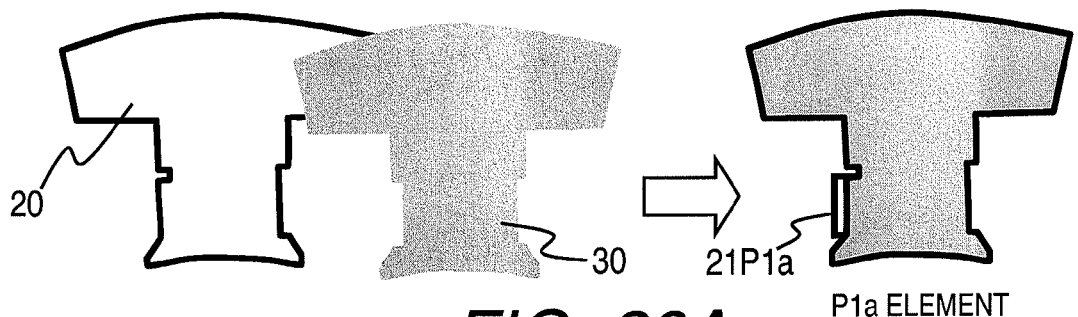
FIG. 20A shows an element comprising a magnetic steel plate and an dielectric material, one element of a stator of a motor according to a ninth embodiment.
Figure 20B:
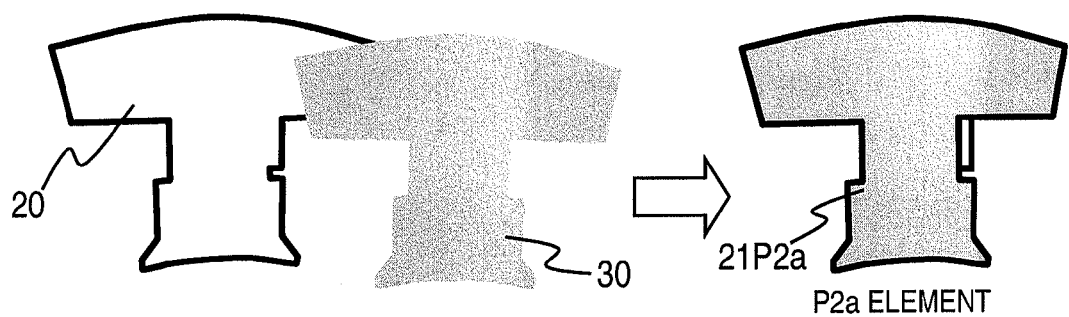
FIG. 20B shows another element comprising a magnetic steel plate and an dielectric material of the stator according to the ninth embodiment.
Figure 20C:
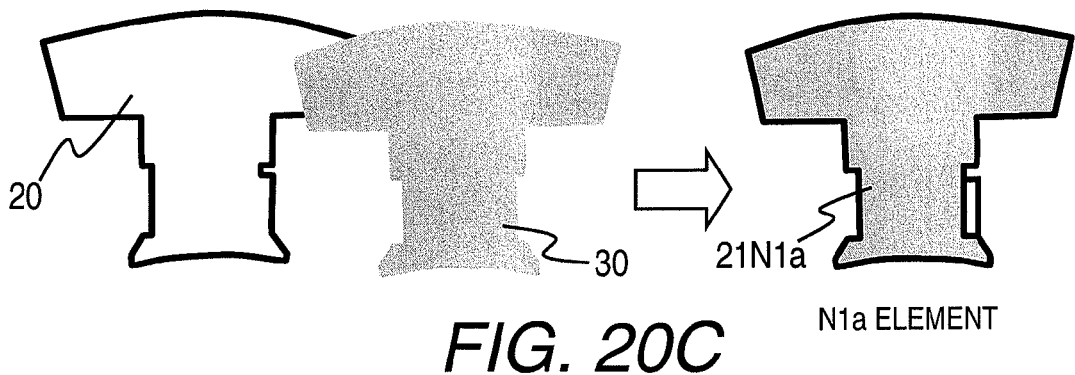
FIG. 20C shows another element comprising a magnetic steel plate and an dielectric material of the stator according to the ninth embodiment.
Figure 20D:
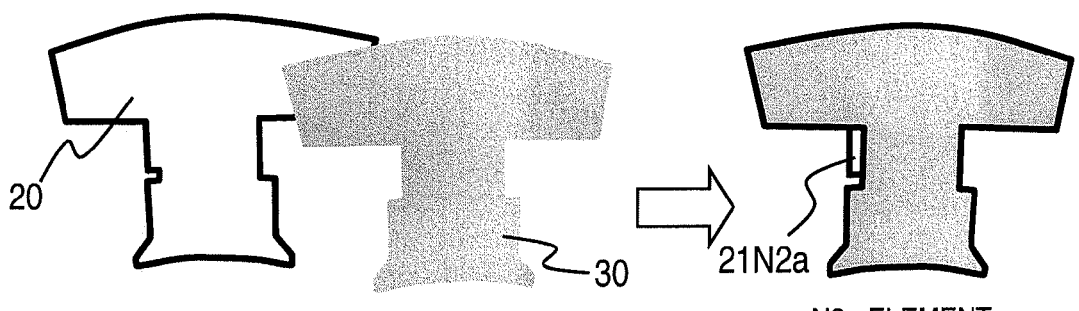
FIG. 20D another element comprising a magnetic steel plate and an dielectric material of the stator according to the ninth embodiment.

FIGS. 20A to 20D show magnetic steel plates 20, which are used with a plurality of similar ones of the magnetic steel plate 20 to form a stator of a motor according to the ninth embodiment. Each of FIGS. 20A and 20B shows an element comprising the dielectric material 30 and the magnetic steel plate 20 that connects to a positive external electrode 16. Each of FIGS. 20C and 20D shows an element comprising the dielectric material 30 and the magnetic steel plate 20 that connects to a negative external electrode 15.

An electrode part is provided on a lower left portion of the tooth part of the magnetic steel plate 20 shown in FIG. 20A. An electrode part is provided on an upper right portion of the tooth part of the magnetic steel plate shown in FIG. 20B. In order to simplify the explanation, the unit comprising the magnetic steel plate 20 and the dielectric material 30 shown in FIG. 20A will be called the "element P1$a$" and the unit comprising the magnetic steel plate 20 and the dielectric material 30 shown in FIG. 20B will be called the "element P2$a$." Additionally, the electrode part of the element P1$a$ will be called an "electrode 21P1$a$" and the electrode part of the element P2$a$ will be called an "electrode 21P2$a$."

An electrode part is provided on a lower right portion of the tooth part of the magnetic steel plate 20 shown in FIG. 20C. Also an electrode part is provided on an upper left portion of the tooth part of the magnetic steel plate shown in FIG. 20D. In order to simplify the explanation, the unit comprising the magnetic steel plate 20 and the dielectric material 30 shown in FIG. 20C will be called an "element N1$a$" and the unit comprising the magnetic steel plate 20 and the dielectric material 30 shown in FIG. 20D will be called an "element N2$a$." Additionally, the electrode part of the element N1$a$ will be called an "electrode 21N1$a$" and the electrode part of the element N2$a$ will be called an "electrode 21N2$a$."

FIG. 21A is a perspective view of the divided core 10 comprising elements P1$a$, P2$a$, N1$a$, and N2$a$ stacked onto one another, and FIG. 21B shows the stacked structure of the divided core 10 shown in FIG. 21A. FIG. 21B shows the left side face and the right side face, respectively, of the tooth portion of the divided core 10. As shown in FIG. 21B, the elements P1$a$, N1$a$, P2$a$, and N2$a$ are repeatedly stacked in order as listed.

Figure 22:
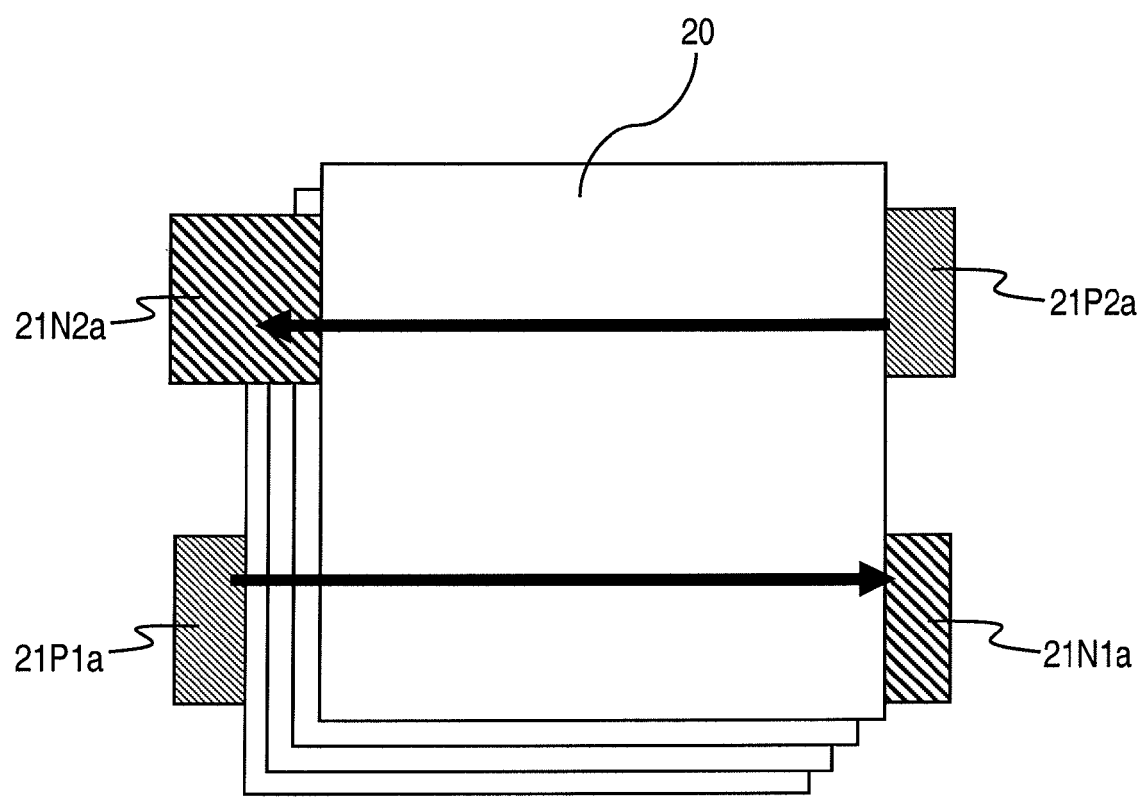
FIG. 22 shows the directions of the capacitor currents that flow in the divided core shown in FIGS. 20A to 20D and 21.

FIG. 22 shows the directions of the capacitor currents that flow in the divided core 10 shown in FIGS. 20A to 20D, 21A and 21B. Similar to the eighth embodiment, as shown in FIG. 22, the current flow direction of the first capacitor and the current flow direction of the second capacitor are oriented in opposing circumferential directions. Thus, as shown in FIG. 22, the current flowing from the electrode part 21P1$a$ of the element P1$a$ to the electrode part 21N1$a$ of the element N1$a$ is oriented in the opposite direction as the direction of the current flowing from the electrode part 21P2$a$ of the element P2$a$ to the electrode part 21N2$a$ of the element N2$a$. Consequently, the magnetic fluxes generated by the first and second capacitors are oriented in different directions, and, thus cancel each other out, enabling the total magnetic flux density to be reduced. As a result, the occurrence of eddy currents in various parts of the magnetic steel plates 20 can be greatly reduced.

As shown in FIG. 22, the electrode part 21P1$a$ of the element P1$a$ and the electrode part 21N1$a$ of the element N1$a$ are positioned across from each other, and the electrode part 21P2$a$ of the element P2$a$ and the electrode part 21N2$a$ of the element N2$a$ are positioned across from each other. As a result, electric current can be distributed widely and evenly in the capacitors.

Tenth Embodiment

Figure 23A:
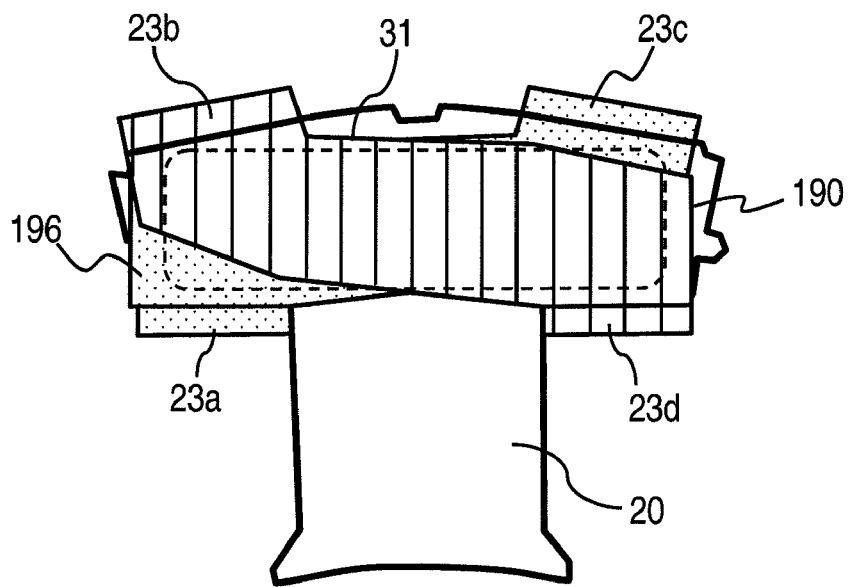
FIG. 23A is an axial view showing the positional relationships of the magnetic steel plates and the positive and negative external electrodes in a divided core of a stator in a motor according to a tenth embodiment.
Figure 23B:
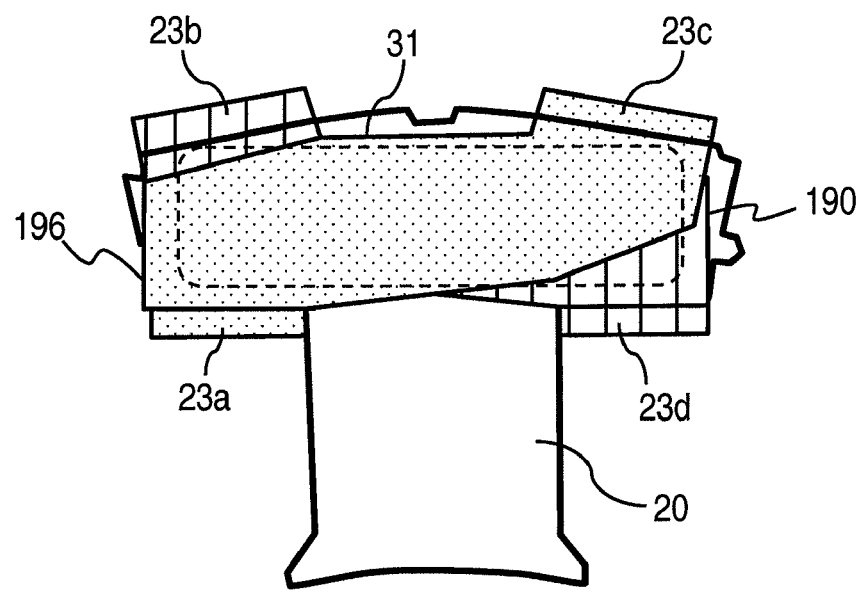
FIG. 23B is an axial view showing the positional relationships of the magnetic steel plates and the positive and negative external electrodes in a divided core of a stator according to the tenth embodiment.

Referring now to FIGS. 23A and 23B, a divided core 10 of a motor is illustrated in accordance with a tenth embodiment. In view of the similarity between the first and tenth embodiments, the descriptions and illustrations of the parts of the tenth embodiment that are identical to the parts of the first embodiment will be omitted for the sake of brevity. In this tenth embodiment, the positive electrode parts and negative electrode parts are arranged such that the electric currents in each (any) pair of adjacent magnetic entities (magnetic steel plates) flow in opposing directions as the current flows from a positive electrode part to a negative electrode part.

FIGS. 23A and 23B show the positional relationships of a positive external electrode 196 and a negative external electrode 190 with respect to the magnetic steel plate 20 of the divided core 10 of a stator in the motor according to the tenth embodiment. In the tenth embodiment, electrode parts are provided on the back yoke part of the magnetic steel plates 20 and the positive external electrodes 23$a$ and 23$c$ that are integral with the positive external electrode 196 are connected to the electrode parts. Similarly, negative external electrodes 23$b$ and 23$d$ that are integral with the negative external electrode 196 are connected to electrode parts of the magnetic steel plates 20. More specifically, magnetic steel plates having the electrode part arranged on the outside of the back yoke part and magnetic steel plates having the electrode part arranged on the inside of the back yoke part are arranged alternately such that the electrode parts of adjacent magnetic steel plates are arranged in on opposite sides of the respective back yoke parts (inside and outside or outside and inside, respectively). Similarly to the second embodiment, the dielectric material 31 is arranged only in the space between the back yoke parts of adjacent magnetic steel plates 20.

In the example shown in FIGS. 23A and 23B, the positive external electrodes 23$a$ are arranged on a lower left portion of the back yoke part of the respective magnetic steel plate 20. The negative external electrodes 23$b$ are arranged on an upper left portion of the back yoke part of the respective magnetic steel plate 20. The positive external electrodes 23$c$ are arranged on an upper right portion of the back yoke part of the respective magnetic steel plate 20. The negative external electrodes 23$d$ are arranged on a lower right portion of the back yoke part of the respective magnetic steel plate 20 when the magnetic steep plates 20 are stacked. The magnetic steel plate 20 having the positive external electrode 23$a$, the magnetic steel plate 20 having the negative external electrode 23$b$, the magnetic steel plate 20 having the positive external electrode 23$c$, and the magnetic steel plate 20 having the negative external electrode 23$d$ are stacked repeatedly in order as listed.

FIG. 23A shows an example in which the negative external electrode 190 is arranged over the positive external electrode 196. FIG. 23B shows an example in which the positive external electrode 196 is arranged over the negative external electrode 190.

In the motor according to the tenth embodiment, the electric currents in any pair of adjacent capacitors flow in opposing directions. More specifically, the direction of a current flowing from the positive external electrode 23a provided on the lower left of the back yoke part of one magnetic steel plate 20 to the negative external electrode 23b provided on the upper left of the back yoke part of the adjacent magnetic steel plate 20 is opposite to the direction of a current flowing from the positive external electrode 23c provided on the upper right of the back yoke part of one of the magnetic steel plate 20 to the negative external electrode 23d provided on the lower right of the back yoke part of the adjacent magnetic steel plate 20. Consequently, the magnetic fluxes generated by adjacent capacitors are oriented in different directions, and thus, cancel each other out, enabling the total magnetic flux density to be reduced. As a result, the occurrence of eddy currents in various parts of the magnetic steel plates 20 can be greatly reduced.

Similarly to the ninth embodiment, the positive external electrode 23a and the negative external electrode 23b are positioned across from each other, and positive external electrode 23c and the negative external electrode 23d are positioned across from each other. As a result, electric current can be distributed widely and evenly in the capacitors.

Eleventh Embodiment

Figure 24A:
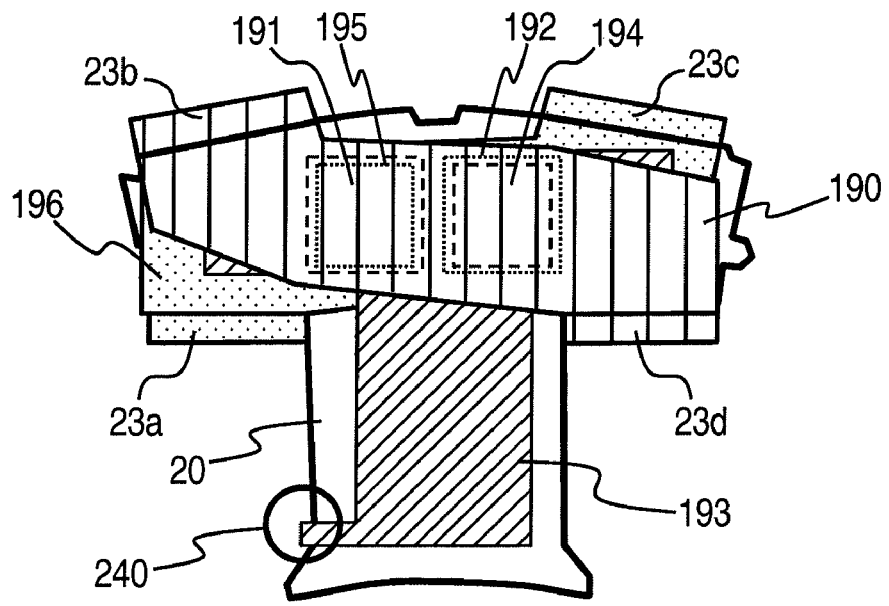
FIG. 24 shows the divided core structure of a motor in accordance with an eleventh embodiment that is the same as the tenth embodiment except that a power module having a switching element and a current rectifying element has been added.
Figure 24B:
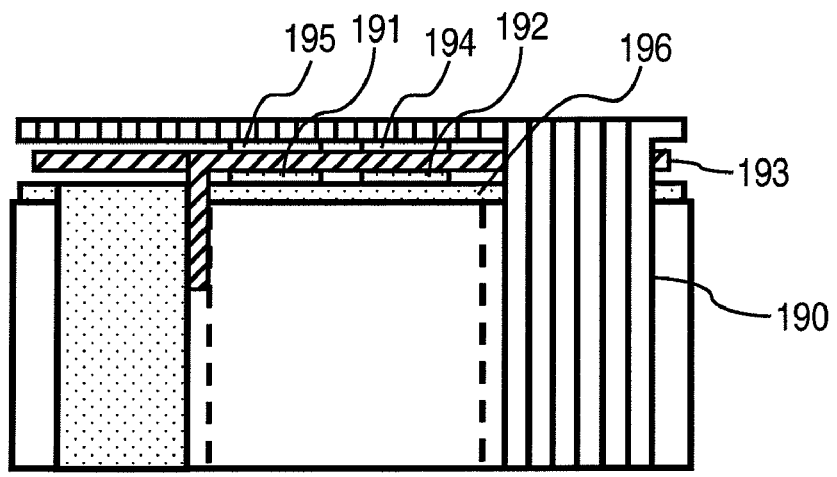

Referring now to FIGS. 24A and 24B, a divided core structure of a motor is illustrated in accordance with an eleventh embodiment. In view of the similarity between the first and eleventh embodiments, the descriptions and illustrations of the parts of the eleventh embodiment that are identical to the parts of the first embodiment will be omitted for the sake of brevity. In this eleventh embodiment, the positive electrode parts and negative electrode parts are arranged such that the electric currents in each (any) pair of adjacent magnetic entities (magnetic steel plates) flow in opposing directions as the current flows from a positive electrode part to a negative electrode part.

FIG. 24 shows one of the magnetic steel plates 20, which are used with a plurality of similar ones of the magnetic steel plate 20 to form a stator of a motor according to the eleventh embodiment. The divided core structure in accordance with this embodiment is the same as the tenth embodiment except that a power module has been added. The power module includes a switching element and a current rectifying element (e.g., a diode). This embodiment is basically the same as the eighth embodiment. FIG. 24A shows the negative external electrode 190, the output external electrode 193, and the positive external electrode 196 in a stacked state. FIG. 24B shows the stacked structure of FIG. 24A when viewed along a stacking direction. As shown in FIG. 24B, a chip 192 carrying a negative electrode switching element and a chip 191 carrying a negative electrode current rectifying element are mounted on the negative external electrode 190 and the output external electrode 193 is stacked over the chips 191 and 192. A chip 195 carrying a positive electrode switching element and a chip 194 carrying a positive electrode rectifying element are mounted on the output external electrode 193 and the positive external electrode 196 is stacked over the chips 194 and 195. The portion 240 is a place where a motor coil connects.

Twelfth Embodiment

Figure 25A:
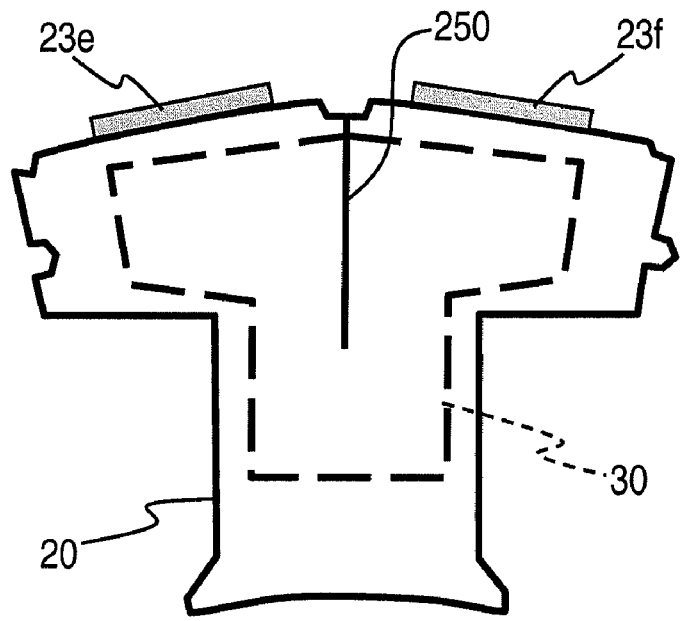
FIG. 25A is an axial view showing a magnetic steel plate, in which a plurality of these magnetic steel plate forms a stator of a motor according to a twelfth embodiment.
Figure 25B:
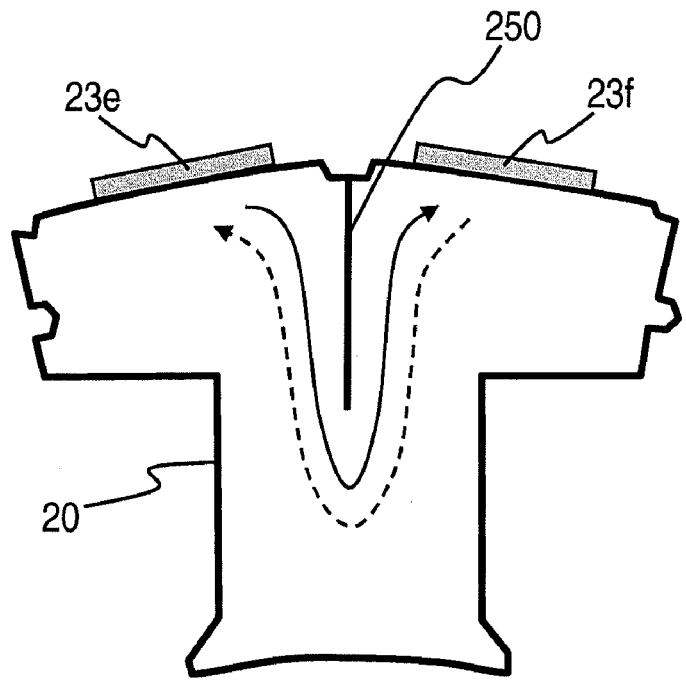
FIG. 25B is an axial view showing the current flow in the magnetic steel plate shown in FIG. 25B according to a twelfth embodiment.

Referring now to FIGS. 25A and 25B, a divided core structure of a motor is illustrated in accordance with a twelfth embodiment. In view of the similarity between the first and twelfth embodiments, the descriptions and illustrations of the parts of the twelfth embodiment that are identical to the parts of the first embodiment will be omitted for the sake of brevity. In this twelfth embodiment, the positive electrode parts and negative electrode parts are arranged such that the electric currents in each (any) pair of adjacent magnetic entities (magnetic steel plates) flow in opposing directions as the current flows from a positive electrode part to a negative electrode part.

FIGS. 25A and 25B shows one of the magnetic steel plates 20, which are used with a plurality of similar ones of the magnetic steel plate 20 to form a stator of a motor according to the twelfth embodiment. The magnetic steel plates 20 having the negative external electrode 23e and the magnetic steel plates 20 having the positive external electrode 23f are stacked alternately. The negative external electrodes 23e and the positive external electrodes 23f are provided on an outside portion of the back yoke part of the respective magnetic steel plates 20.

In the twelfth embodiment, each of the magnetic steel plates 20 has a slit 250 provided between the positions of the negative external electrode 23e of one magnetic steel plate 20 and the positive external electrode 23f of an adjacent magnetic steel plate 20. In other words, the slit 250 is positioned so as to divide the magnetic steel plate 20 into left and right sections. The slits 250 serve to prevent the current flowing between the negative external electrodes 23e and the positive external electrodes 23f from concentrating in positions near the electrode parts 23e and 23f. The current paths that result when a slit 250 is provided in each of the magnetic steel plates 20 are shown in FIG. 25B. As shown in FIG. 25B, the slits 250 cause the current to flow through the tooth parts of the magnetic steel plates 20.

As shown in FIG. 25B, the current paths on the left and right sides of the slit 250 are symmetrical. Since the directions of the currents are opposite in adjacent pairs of the magnetic steel plates 20, the magnetic fluxes resulting from the currents in the magnetic steel plates are oriented in different directions and cancel one another out, enabling the total magnetic flux density to be reduced. As a result, eddy currents can be greatly reduced. Better still, if the divided core is configured such that the currents in adjacent capacitors are oriented in opposing directions similarly to the previous embodiments, then the directions of the magnetic fluxes emitted from adjacent capacitors will be different and cancel one another out, enabling the total magnetic flux density to be reduced. Additionally, since only one slit 250 is provided in each of the magnetic steel plates 20, the main magnetic flux passing through the tooth parts of the divided cores is not obstructed and there is little effect on the performance of the motor.

Thirteenth Embodiment

Figure 26:
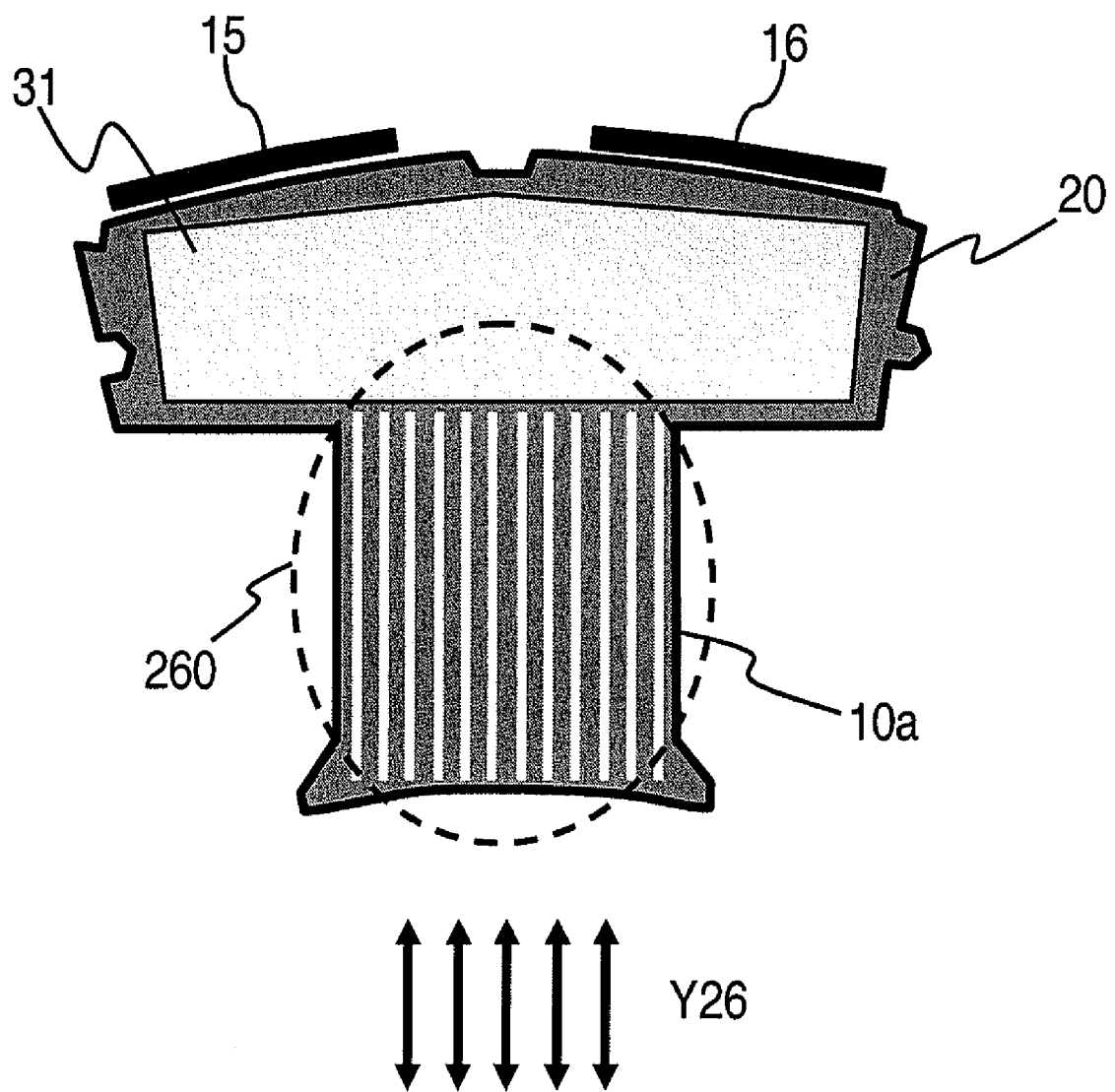
FIG. 26 is an axial view showing a magnetic steel plate of a divided core, in which a plurality of these magnetic steel plates form a stator of a motor according to a thirteenth embodiment.
Figure 27:
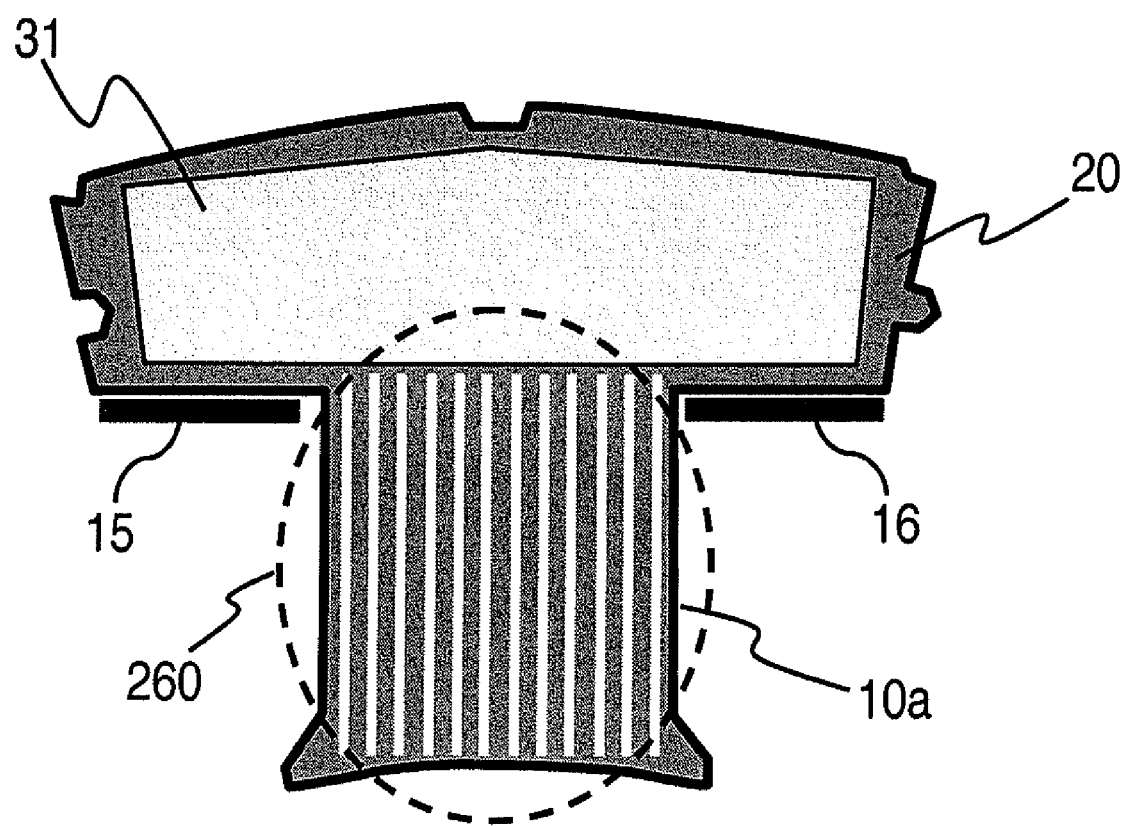
FIG. 27 is an axial view showing a magnetic steel plate provided with a plurality of slits that forms part of a divided core of a stator in which the external electrodes are provided on an inward side of the back yoke.

Referring now to FIGS. 26 and 27, a divided core structure of a motor illustrated in accordance with a thirteenth embodiment in which each of the magnetic steel plates making up the stator of the motor is provided with a plurality of slits 260. In view of the similarity between the first and thirteenth embodiments, the descriptions and illustrations of the parts of the thirteenth embodiment that are identical to the parts of the first embodiment will be omitted for the sake of brevity.

FIG. 26 shows one of the magnetic steel plates 20, which are used with a plurality of similar ones of the magnetic steel plate 20 to form a stator of a motor according to the thirteenth embodiment. As shown in FIG. 26, similarly to the second embodiment, the dielectric material 31 is arranged only in the space between the back yoke parts of the adjacent ones of the magnetic steel plates 20.

In this embodiment, since the stator is provided with integrated capacitors, magnetic flux is generated by the current flowing through the capacitors and eddy currents are generated by the magnetic flux. In order to suppress the occurrence of eddy currents in the motor according to the thirteenth embodiment, the slits 260 are provided in each of the magnetic steel plates 20 of the divided cores 10 forming the stator of the motor. Although FIG. 26 shows only one of the magnetic steel plates 20, the slits 260 are provided in the same manner in the other magnetic steel plates 20.

The slits 260 are arranged generally parallel to the direction of the main magnetic flux of the motor such that a magnetic resistance is not increased. The main magnetic flux generated in the tooth parts of the divided cores 10 by the coil wound about the tooth parts is oriented in the direction indicated by the arrows Y26 in order to drive the rotor 121. Therefore, the slits 260 are also arranged generally along the direction of the arrows Y26. By arranging the slits 260 along the direction of the main magnetic flux of the motor, the existence of the slits 260 in the magnetic steel plates 20 can be prevented from affecting the operation of the motor.

The slits 260 are provided in the portion of the magnetic steel plate 20 not contacted by the dielectric material 31, i.e., in the tooth portion 10a, because providing slits in the portion where the dielectric material 31 contacts would cause the capacitance of the capacitor to decrease. In other words, the slits 260 are provided in the portion where the dielectric material 31 does not contact in order to prevent the capacitance of the capacitors from declining due to the existence of the slits 260.

Similarly, if the external electrodes 15 and 16 are provided on the inward side of the back yoke of the stator (see FIG. 9), then the slits 260 can be provided in each of the magnetic steel plates 20 as shown in FIG. 27.

Fourteenth Embodiment

Figure 28:
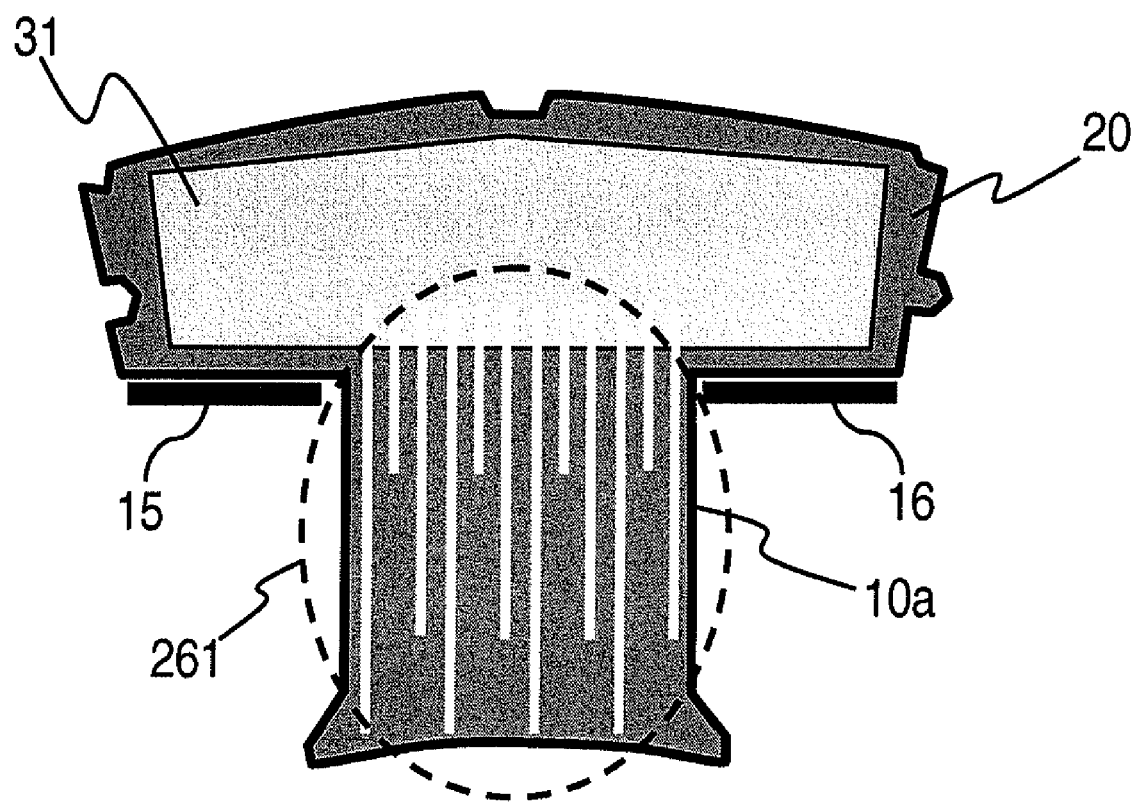
FIG. 28 is an axial view showing a magnetic steel plate of a divided core, in which a plurality of these magnetic steel plates form a stator of a motor according to a fourteenth embodiment.

Referring now to FIG. 28, a divided core structure of a motor illustrated in accordance with a fourteenth embodiment in which each of the magnetic steel plates making up the stator of the motor is provided with a plurality of slits 261. In view of the similarity between the first and fourteenth embodiments, the descriptions and illustrations of the parts of the fourteenth embodiment that are identical to the parts of the first embodiment will be omitted for the sake of brevity.

FIG. 28 shows one of the magnetic steel plates 20, which are used with a plurality of similar ones of the magnetic steel plate 20 to form a stator of a motor according to the fourteenth embodiment. Similarly to the thirteenth embodiment, the motor according to the fourteenth embodiment has the slits 261 provided in a portion of each of the magnetic steel plates 20 where the dielectric material 31 does not contact. The difference is that in the fourteenth embodiment, the slits 261 are provided more densely nearer to the portion where the dielectric material 31 contacts and more sparsely farther away from the portion where the dielectric material 31 contacts.

The incidence of eddy currents resulting from magnetic flux generated by capacitor current is higher in positions closer to the portion where the dielectric material 31 is provided. Therefore, the occurrence of eddy currents can be suppressed in an effective manner by providing the slits 261 more densely near the portion where the dielectric material 31 contacts. Meanwhile, providing the slits 261 more sparsely in positions farther from the portion where the dielectric material 31 contacts the magnetic steel plate 20 has little effect on the eddy currents because there is little incidence of eddy currents in those positions anyway. Furthermore, providing the slits 261 more sparely enables the magnetic resistance to be reduced in comparison with not providing the slits more sparsely.

Fifteenth Embodiment

Figure 29:
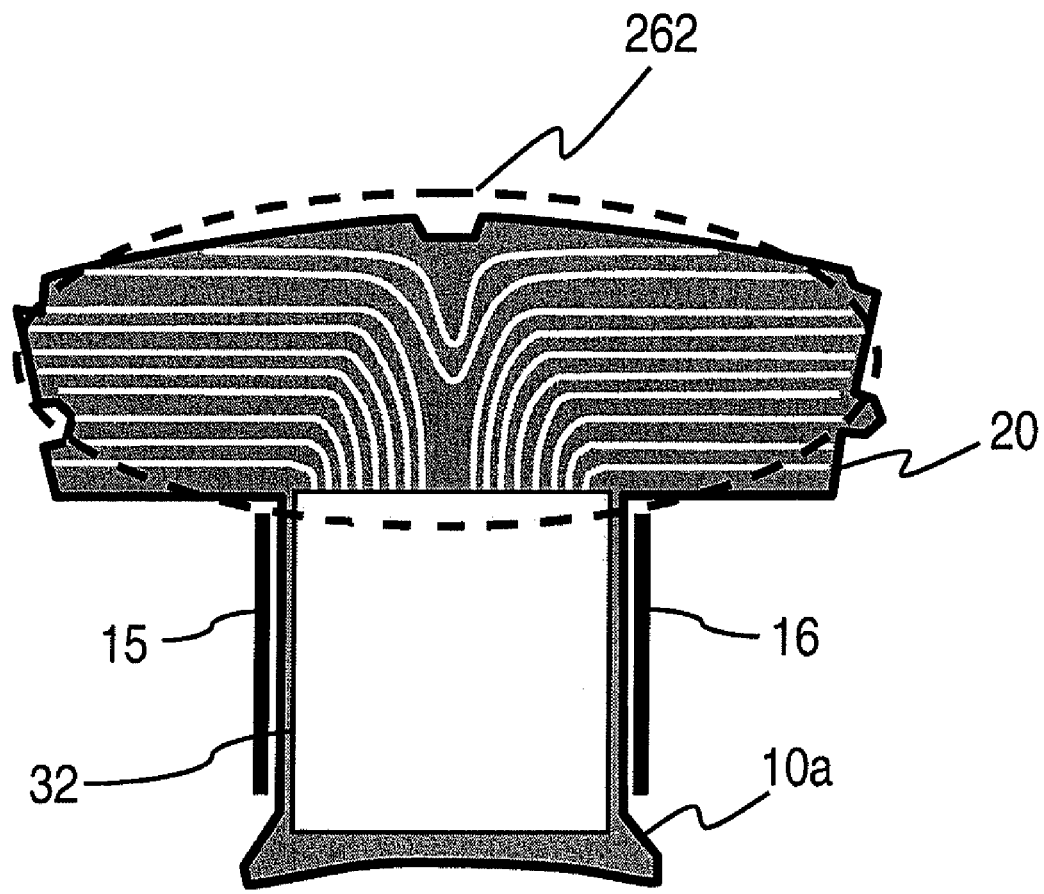
FIG. 29 is an axial view showing a magnetic steel plate of a divided core, in which a plurality of these magnetic steel plates form a stator of a motor according to a fifteenth embodiment.

Referring now to FIG. 29, a divided core structure of a motor illustrated in accordance with a fifteenth embodiment in which each of the magnetic steel plates making up the stator of the motor is provided with a plurality of slits 262. In view of the similarity between the first and fifteenth embodiments, the descriptions and illustrations of the parts of the fifteenth embodiment that are identical to the parts of the first embodiment will be omitted for the sake of brevity.

FIG. 29 shows one of the magnetic steel plates 20, which are used with a plurality of similar ones of the magnetic steel plate 20 to form a stator of a motor according to the fifteenth embodiment. In the motor according to the fifteenth embodiment, the dielectric material 32 is provided in the space between the tooth portions 10a of adjacent magnetic steel plates 20. The slits 262 is provided in a portion of each magnetic steel plate 20 where the dielectric material 32 does not contact the magnetic steel plate 20. The slits 262 are configured to be generally parallel to the direction of the main magnetic flux generated in the back yoke part of the divided core 10 by the coil when the motor is driven. More specifically, as shown in FIG. 29, the slits 262 are configured to extend toward both sides of the back yoke from the tooth portion 10a.

The negative external electrode 15 and the positive external electrode 16 are arranged generally parallel to and across from each other on opposite sides of the tooth portion 10a. This arrangement of the external electrodes 15 and 16 enables electric current to flow uniformly between the positive external electrode 16 and the negative external electrode 15. Since the dielectric material 32 is provided in the space between the tooth parts 10a of adjacent magnetic steel plates 20, electric current can be passed through the dielectric material 32, i.e., through the capacitors, in a uniform and dispersed manner. In contrast, with the structure shown in FIG. 26, the current does not flow through the capacitors in a uniformly dispersed manner because the current flows more readily at positions closer to the external electrodes 15 and 16 than at positions farther away.

Sixteenth Embodiment

Figure 30:
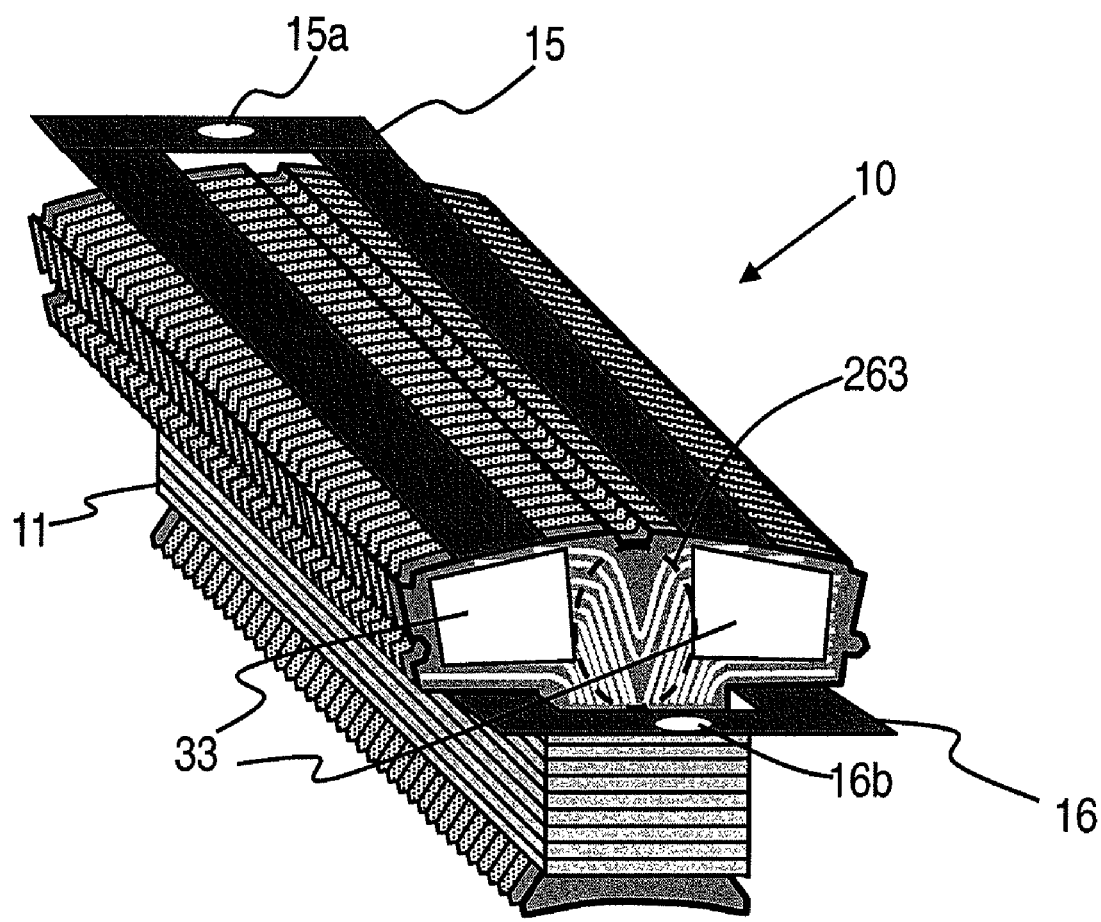
FIG. 30 is a perspective view of a divided core, in which a plurality of these magnetic steel plates form a stator of a motor according to a sixteenth embodiment.

Referring now to FIG. 30, a divided core structure of a motor illustrated in accordance with a sixteenth embodiment in which each of the magnetic steel plates making up the stator of the motor is provided with a plurality of slits 263. In view of the similarity between the first and sixteenth embodiments, the descriptions and illustrations of the parts of the sixteenth embodiment that are identical to the parts of the first embodiment will be omitted for the sake of brevity.

FIG. 30 shows one of the magnetic steel plates 20, which are used with a plurality of similar ones of the magnetic steel plate 20 to form a stator of a motor according to the sixteenth embodiment. In the motor according to the sixteenth embodiment, the dielectric material 33 is provided in the space between the left and right sides of the back yoke parts of adjacent T-shaped magnetic steel plates 20. Additionally, the slits 263 are provided in the tooth part of each magnetic steel plate 20 and the portion of the back yoke part where the dielectric material 33 does not contact. Similarly to the previous embodiment, the slits 263 are configured to extend generally parallel to the direction of the main magnetic flux of the motor.

The negative external electrode 15 is arranged on the outward side of the back yoke part of the divided core 10 and the positive external electrode 16 is arranged on the inward side of the back yoke part of the divided core 10. The negative external electrode 15 has a connecting part 15a configured to connect the negative external electrode 15 to an external circuit (not shown) containing a power source. The positive external electrode 16 has a connecting part 16a configured to connect the positive external electrode 16 to an external circuit (not shown) containing a power source. The connecting parts 15a and 16a are provided on opposite ends of the stator along the direction of a rotational axis. As shown in FIG. 30, the negative external electrode 15 and the positive external electrode 16 arranged generally parallel to and across from each other. As a result, since electric current flows from one end of the stator toward the other, electric current can be made to flow uniformly in the capacitors formed by the magnetic steel plates 20 and the dielectric material 33 disposed there-between.

Seventeen Embodiment

Figure 31:
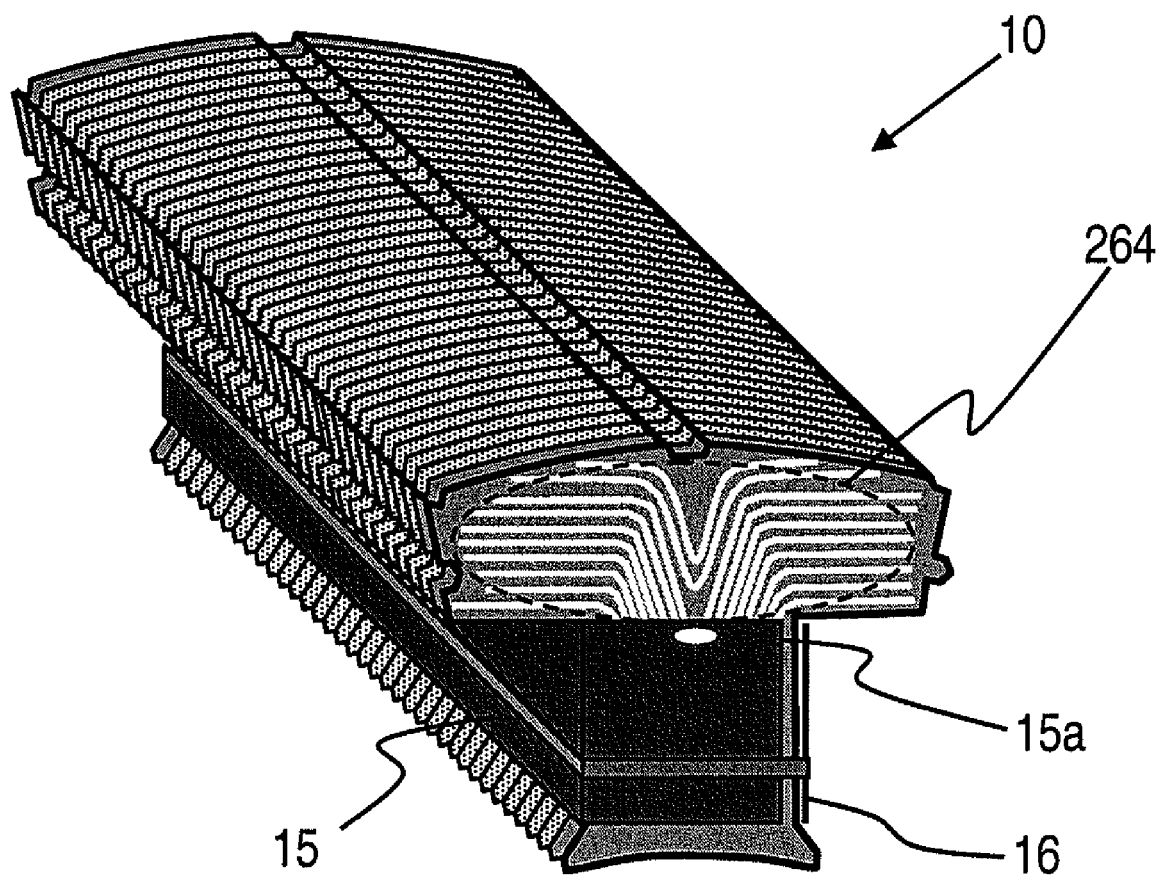
FIG. 31 is a perspective view of a divided core, in which a plurality of these magnetic steel plates form a stator of a motor according to a seventeenth embodiment.

Referring now to FIG. 31, a divided core structure of a motor illustrated in accordance with a seventeenth embodiment in which each of the magnetic steel plates making up the stator of the motor is provided with a plurality of slits 264. In view of the similarity between the first and seventeenth embodiments, the descriptions and illustrations of the parts of the seventeenth embodiment that are identical to the parts of the first embodiment will be omitted for the sake of brevity.

FIG. 31 shows one of the magnetic steel plates 20, which are used with a plurality of similar ones of the magnetic steel plate 20 to form a stator of a motor according to the seventeenth embodiment. In the motor according to the seventeenth embodiment, the negative external electrode 15 and the positive external electrode 16 are both generally L-shaped and arranged on the tooth part of the divided core 10 so as to be generally parallel to and face across from each other. More specifically, each of the external electrodes 15 and 16 is L-shaped so as to extend from a side face of the tooth portion to an axially facing end portion of the stator ("axially facing" meaning facing in a direction parallel to the rotational axis).

Although omitted in FIG. 31, the dielectric material is arranged between the tooth parts of adjacent magnetic steel plates. Similarly to the magnetic steel plate 20 shown in FIG. 29, each of the magnetic steel plates 20 of this embodiment is provided with the slits 264 that extend from the tooth part to both sides of the back yoke part in a portion where the dielectric material does not contact the magnetic steel plate 20.

A connecting part (not shown) contrived to connect the positive external electrode 16 to an external circuit (not shown) containing a power source, and a connecting part 15a contrived to connect the negative external electrode 15 to an external circuit (not shown) containing a power source are provided on opposite ends of the stator along the direction of a rotational axis. As explained above, the negative external electrode 15 and the positive external electrode 16 arranged generally parallel to and across from each other. As a result, similarly to the sixteenth embodiment, since electric current flows from one end of the stator toward the other, electric current can be made to flow uniformly in the capacitors formed by the magnetic steel plates 20 and the dielectric material disposed there-between.

Eighteenth Embodiment

Figure 32:
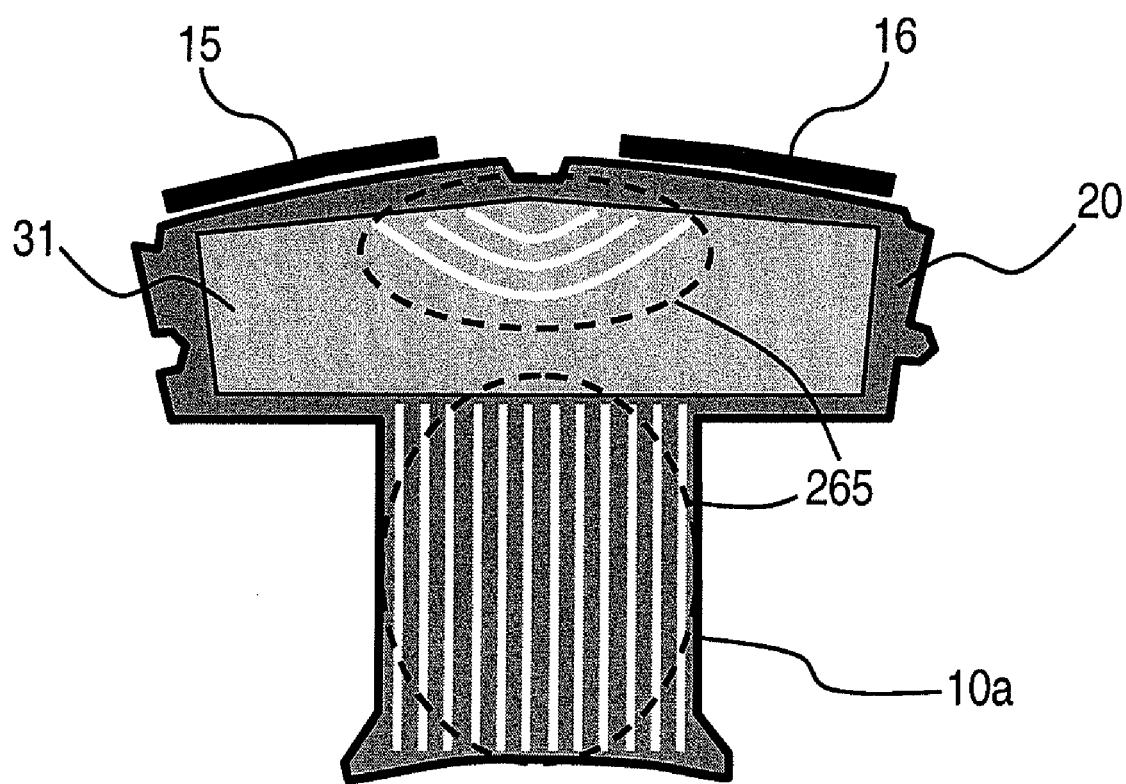
FIG. 32 is an axial view showing a magnetic steel plate of a divided core, in which a plurality of these magnetic steel plates form a stator of a motor according to an eighteenth embodiment.

Referring now to FIG. 32, a divided core structure of a motor illustrated in accordance with an eighteenth embodiment in which each of the magnetic steel plates making up the stator of the motor is provided with a plurality of slits 265. In view of the similarity between the first and eighteenth embodiments, the descriptions and illustrations of the parts of the eighteenth embodiment that are identical to the parts of the first embodiment will be omitted for the sake of brevity.

FIG. 32 shows one of the magnetic steel plates 20, which are used with a plurality of similar ones of the magnetic steel plate 20 to form a stator of a motor according to the eighteenth embodiment. In the thirteenth embodiment shown in FIG. 26, the slits 265 are provided in a portion of the magnetic steel plate 20 where the dielectric material 31 does not contact. In the eighteenth embodiment, slits 265 are provided both in the portion of the magnetic steel plate 20 where the dielectric material 31 does not contact and in the portion where the dielectric material 31 does contact.

Similarly to the thirteenth embodiment, the slits 265 are configured to be generally parallel to the direction of the main magnetic flux of the motor in the portion where the dielectric material does not contact. Meanwhile, the slits provided in the portion where the dielectric material 31 does contact the magnetic steel plate 20, the slits are configured to be generally parallel to direction of the current that flows through the capacitor. By providing slits in the portion where the electric material 31 exists, the equivalent series resistance (ESR) of the capacitor can be prevented from rising.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired, e.g., the shape of the dielectric material arranged between the magnetic steel plates is not limited to the shapes described above in the embodiments. Components that are shown directly connected or contacting each other can have intermediate structures disposed between them. The functions of one element can be performed by two, and vice versa. Also for example, the invention is described herein based on a motor having a cylindrical stator made of divided cores 10 arranged in an annular fashion, but the present invention can also be applied to a linear motor in which the stator flat. Although the stator in the embodiments has a divided core structure, the present invention can also be applied to a stator having a one-piece core structure. With a one-piece structure, it is not necessary to arrange for the magnetic steel plates of adjacent divided cores having the same potential to contact one another (as shown in FIG. 6). The motor is not limited to a concentrated winding; it is acceptable if the motor is has a distributed winding.

The distinctive features of the first to eighteenth embodiments can be combined to the extent that combining them is feasible. In other words, the structures and functions of one embodiment can be adopted in another embodiment if feasible. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A motor comprising:
   a rotor; and
   a stator including a plurality of divided cores arranged in a circumferential direction about the stator, with each of the divided cores including
      a plurality of stacked magnetic entities;
      a dielectric material disposed between adjacent ones of the magnetic entities;
      a positive electrode part provided on at least one of the magnetic entities for connecting to a positive side of an external circuit; and
      a negative electrode part provided on at least one of the magnetic entities that does not have the positive electrode part for connecting to a negative side of the external circuit;
   wherein
   the positive electrode part is provided directly on the at least one of the magnetic entities so that a conductive portion of the positive electrode part directly electrically contacts the at least one of the magnetic entities; and
   the negative electrode part is provided directly on the at least one of the magnetic entities that does not have the positive electrode part so that a conductive portion of the negative electrode part directly electrically contacts the at least one of the magnetic entities that does not have the positive electrode part.

2. The motor as recited in claim 1, wherein
   the stator includes a plurality of the positive and negative electrode parts such that the magnetic entities includes a plurality of positive magnetic entities and a plurality of negative magnetic entities, the positive and negative electrode parts being arranged such that each of the positive and negative magnetic entities has a particular electric current flow direction;
   the positive and negative magnetic entities are arranged such that pairs of immediately adjacent ones of the positive and negative magnetic entities form a plurality of capacitors with each of the capacitors including a positive magnetic entity, an immediately adjacent negative magnetic entity having the same electric current flow direction as the positive magnetic entity of the same capacitor, and the dielectric material disposed between the two immediately adjacent magnetic entities; and
   the positive and negative electrode parts are further arranged such that the electric current flow direction of the pairs of the positive and negative magnetic entities making up any one of the capacitors is opposite the electric current flow direction of the pairs of the positive and negative magnetic entities making up any adjacent other ones of the capacitors.

3. The motor as recited in claim 2, wherein
   each of the positive and negative magnetic entities includes a back yoke part and a tooth part,
   the positive and negative electrode parts of the capacitors are arranged on circumferentially oppositely facing edge portions of the positive and negative magnetic entities, respectively, in positions corresponding to opposite side faces of the tooth parts of the positive and negative magnetic entities, respectively, for each of the pairs of the positive and negative magnetic entities,
   the positive electrode parts of adjacent ones of the capacitors are arranged on circumferentially oppositely facing ones of the edge portions of the corresponding one of the positive magnetic entities, and
   the negative electrode parts of adjacent ones of the capacitors are arranged on circumferentially oppositely facing ones of the edge portions of the corresponding one of the negative magnetic entities.

4. The motor as recited in claim 3, wherein
   the positions of the positive and negative electrode parts of any one of the capacitors are offset in a radial direction from the positions of the positive and negative electrode parts of any adjacent one of the capacitors such that the positive and negative electrode parts of the capacitors alternate farther inward or farther outward in a radial direction along respective ones of the side face of the tooth parts.

5. The motor as recited in claim 3, wherein
   the positions of the positive electrode parts of the capacitors are offset in a radial direction from the positions of the negative electrode parts of the capacitors such that one type of the positive or negative electrode parts of each of the capacitors is provided farther inward in the radial direction along a respective one of the side faces of the tooth parts and the other type of the positive or negative electrode parts of each of the capacitors is provided farther outward in the radial direction along the respective one of the side faces of the tooth parts.

6. The motor as recited in claim 2, wherein
   the positive and negative electrode parts of the positive and negative magnetic entities are arranged to be offset from each other in a circumferential direction or a radial direction of the stator when viewed along a direction in which the positive and negative magnetic entities are stacked; and
   the positive and negative magnetic entities is provided with a slit in a position lying between the positive and negative electrode parts when viewed along a direction in which the positive and negative magnetic entities are stacked.

7. The motor as recited in claim 1, wherein
   the positive and negative magnetic entities include a plurality of slits.

8. The motor as recited in claim 7, wherein
the stator includes a back yoke part, a tooth part and a coil, with the coil part being wound around the tooth part to generate a main magnetic flux in the back yoke part and the tooth part serving to drive the rotor of the motor; and
the magnetic entities include a plurality of slits formed along a direction of the main magnetic flux.

9. The motor as recited in claim 8, wherein
the magnetic entities include contact portions where the dielectric material touches and non-contact portions of the magnetic entities where the dielectric material does not touch, with the slits being located in the non-contact portions.

10. The motor as recited in claim 8, wherein
the slits of the magnetic entities are formed to be denser nearer to contact portions where the dielectric material contact and sparser farther away from the contact portions where the dielectric material contacts.

11. The motor as recited in claim 8, further comprising
a positive external electrode connected to the positive electrode parts; and
a negative external electrode connected to the negative electrode parts, with the positive and negative external electrodes being arranged to face each other with the tooth parts disposed between the positive and negative external electrodes.

12. The motor as recited in claim 8, wherein
the positive electrode parts are connected to the external circuit by a first connecting part and the negative electrode parts are connected to the external circuit by a second connecting part with the first and second connecting parts being provided on opposite ends of the magnetic entities with respect to a direction in which the magnetic entities are stacked.

13. The motor as recited in claim 8, wherein
each of the magnetic entities has a slit that extend along a current flow direction of the magnetic entities.

14. The motor as recited in claim 1, wherein
each of the magnetic entities has a back yoke part and a tooth part with the positive and negative electrode parts being provided on an outside of the back yoke parts of the magnetic entities.

15. The motor as recited in claim 14, wherein
the dielectric material is arranged between adjacent one of the magnetic entities at portions generally corresponding to the back yoke parts with an electrically insulating material being arranged between adjacent one of the magnetic entities at portions generally corresponding to the tooth parts, the dielectric material having a high dielectric constant and the insulating material having a high withstand voltage.

16. The motor as recited in claim 15, wherein
the dielectric material and the insulating material between any given pair of adjacent ones of the magnetic entities are arranged in a single plane.

17. The motor as recited in claim 1, wherein
the positive and negative electrode parts are arranged such that a plurality of the magnetic entities without the positive and negative electrode parts are located between adjacent ones of the magnetic entities having the positive and negative electrode parts.

18. The motor as recited in claim 17, wherein
the stator includes a plurality of the positive and negative electrode parts, with the positive and negative electrode parts being arranged with respect to the magnetic entities such that a group of the magnetic entities arranged in order from a lowest electric potential to a highest electric potential and a group of the magnetic entities arranged in order from a highest electric potential to a lowest electric potential exist repeatedly and alternately along the direction in which the magnetic entities are stacked.

19. The motor as recited in claim 14, wherein
the stator includes a plurality of the positive and negative electrode parts such that the magnetic entities includes a plurality of positive magnetic entities and a plurality of negative magnetic entities, the positive and negative electrode parts being arranged such that each of the positive and negative magnetic entities has a particular electric current flow direction;
the positive and negative magnetic entities are arranged such that pairs of immediately adjacent ones of the positive and negative magnetic entities form a plurality of capacitors with each of the capacitors including a positive magnetic entity, an immediately adjacent negative magnetic entity having the same electric current flow direction as the positive magnetic entity of the same capacitor, and the dielectric material disposed between the two immediately adjacent magnetic entities; and
the positive and negative electrode parts are further arranged such that the electric current flow direction of the pairs of the positive and negative magnetic entities making up any one of the capacitors is opposite the electric current flow direction of the pairs of the positive and negative magnetic entities making up any adjacent other ones of the capacitors and an insulating material having a high withstand voltage being disposed between adjacent capacitors.

20. The motor as recited in claim 14, wherein
the positive and negative electrode parts are provided with folded over portions that increase a contact surface area with respect to an external electrode.

21. The motor as recited in claim 14, wherein
one of the positive and negative electrode parts is fixed to a motor case.

22. The motor as recited in claim 21, wherein
one of the positive and negative electrode parts is at a ground potential and that one of the positive and negative electrode parts is fixed to the motor case.

23. The motor as recited in claim 1, wherein
the magnetic entities having the same electric potential contact each other.

24. The motor as recited in claim 1, wherein
the magnetic entities has a switching element constituting a constituent component of an inverter located on an end face formed by the magnetic entities.

25. The motor as recited in claim 1, wherein
each of the magnetic entities is at least coated with a conductive metal film at a portion that touches against the dielectric material.

26. A motor system comprising:
a motor including a rotor and a stator;
a voltage source; and
an electric power converting section contrived to convert electric power from the voltage source into electric power to be applied to the motor,
the stator including a plurality of divided cores arranged in a circumferential direction about the stator, with each of the divided cores including
a plurality of stacked magnetic entities,
a dielectric material disposed between adjacent ones of the magnetic entities;
a positive electrode part provided on at least one of the magnetic entities and connected to a positive side of a circuit connecting the voltage source and the electric power converting section together, and a negative electrode part provided on at least one of the magnetic entities that does not have the positive electrode part and connected to a negative side of the circuit connecting the voltage source and the electric power converting section together;

wherein the positive electrode part is provided directly on the at least one of the magnetic entities so that a conductive portion of the positive electrode part directly electrically contacts the at least one of the magnetic entities; and the negative electrode part is provided directly on the at least one of the magnetic entities that does not have the positive electrode part so that a conductive portion of the negative electrode part directly electrically contacts the at least one of the magnetic entities that does not have the positive electrode part.

* * * * *